US007174534B2

(12) United States Patent
Chong et al.

(10) Patent No.: US 7,174,534 B2
(45) Date of Patent: Feb. 6, 2007

(54) EFFICIENT SYSTEM AND METHOD FOR RUNNING AND ANALYZING MULTI-CHANNEL, MULTI-MODAL APPLICATIONS

(75) Inventors: Kelvin Chong, Sunnyvale, CA (US); Pavel Syrtsov, San Jose, CA (US); Srinivas Mandyam, San Jose, CA (US); Vikranth Katpally Reddy, Sunnyvale, CA (US); Krishna Vedati, Sunnyvale, CA (US); Janakiraman Gopalan, San Jose, CA (US); Janak Bhalodia, Mountain View, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 613 days.

(21) Appl. No.: 10/053,767

(22) Filed: Jan. 18, 2002

(65) Prior Publication Data

US 2002/0144233 A1    Oct. 3, 2002

Related U.S. Application Data

(60) Provisional application No. 60/263,574, filed on Jan. 22, 2001.

(51) Int. Cl.
*G06F 9/44* (2006.01)
*G06F 15/00* (2006.01)
*G06F 15/16* (2006.01)
*G06F 15/173* (2006.01)
*H04L 12/66* (2006.01)

(52) U.S. Cl. .............. 717/105; 370/352; 709/201; 709/207; 709/226; 709/227; 709/228; 715/500

(58) Field of Classification Search ............ 709/203, 709/219, 225, 201, 207, 226–228; 717/100, 717/105; 455/558, 452.2; 370/352; 715/500
See application file for complete search history.

(56) References Cited

U.S. PATENT DOCUMENTS 5,974,252 A * 10/1999 Lin et al. ............... 717/108

(Continued)

OTHER PUBLICATIONS

Abramowski, S; "Multimedia Session Management", IEEE Apr. 1996, retrieved Mar. 3, 2005.*

(Continued)

*Primary Examiner*—Mary Steelman
(74) *Attorney, Agent, or Firm*—Ingrassia, Fisher & Lorenz, P.C.

(57) ABSTRACT

A system for developing, running and analyzing multi-modal applications includes a development platform, a run-time engine, and a data-mining module. Once a mobile application is built and tested on the development platform, it can be automatically deployed on the run-time system, which maintains and manages the application. Further, the data-mining system allows access to reporting and analysis tools that aid in understanding end-user behavior and preferences. This data can be used to further enhance applications by redesigning and redeploying them in a rapid and efficient manner.

13 Claims, 41 Drawing Sheets

U.S. PATENT DOCUMENTS

| | | | |
|---|---|---|---|
| 6,049,664 A * | 4/2000 | Dale et al. | 717/174 |
| 6,173,437 B1 * | 1/2001 | Polcyn | 717/100 |
| 6,516,416 B2 * | 2/2003 | Gregg et al. | 713/201 |
| 6,546,425 B1 * | 4/2003 | Hanson et al. | 709/227 |
| 6,577,733 B1 * | 6/2003 | Charrin | 380/251 |
| 6,714,979 B1 * | 3/2004 | Brandt et al. | 709/225 |
| 6,779,042 B1 * | 8/2004 | Kloba et al. | 709/248 |
| 6,785,713 B1 * | 8/2004 | Freeman et al. | 709/208 |
| 6,996,800 B2 * | 2/2006 | Lucassen et al. | 717/106 |
| 2001/0054067 A1 * | 12/2001 | Miller et al. | 709/203 |
| 2002/0049788 A1 * | 4/2002 | Lipkin et al. | 707/513 |
| 2002/0075305 A1 * | 6/2002 | Beaton et al. | 345/751 |
| 2002/0138617 A1 * | 9/2002 | Christfort et al. | 709/225 |
| 2002/0183067 A1 * | 12/2002 | Airy et al. | 455/455 |
| 2003/0101343 A1 * | 5/2003 | Eaton et al. | 713/170 |
| 2003/0126584 A1 * | 7/2003 | Creamer et al. | 717/109 |

OTHER PUBLICATIONS

Chin, Kwna-Wu; Kumar, Mohan; "AMTree: An Active Approach to Multicasting in Mobile Networks", p. 361-376, ACM Aug. 2001, retrieved Mar. 3, 2005.*

Holbrook, Hugh W; Cheriton, David R; "IP Multicast Channels: EXPRESS Suppport for Large-scale Single-source Applications",p. 65-78, 1999 ACM, retrieved Mar. 3, 2005.*

Ramanathan, Srinivas; Guselia, Riccardo; "A Home Network Controller for Providing Broadband Access to Residential Subscribers", p. 859-868, IEEE 1995, retrieved Mar. 3, 2005.*

* cited by examiner

```xml
<?xml version="1.0"?>
<DeviceLibrary>
  <Condition>
    <Expr http-header="accept">
      <Pattern expr="text/html" substring="true" case-sensitive="false"/>
      <Pattern expr="text/xhtml" substring="true" case-sensitive="false"/>
      <Pattern expr="text/chtml" substring="true" case-sensitive="false"/>
      <Pattern expr="*/*" substring="true" case-sensitive="false"/>
    </Expr>
  </Condition>
  <Device category="cHTML Device" directory="chtml">
    <Condition>
      <Expr http-header="accept">
        <Pattern expr="text/chtml" substring="true" case-sensitive="false"/>
      </Expr>
    </Condition>
  </Device>
  <Device category="HTML Device" directory="html">
    <Condition>
      <Expr http-header="accept">
        <Pattern expr="text/html" substring="true" case-sensitive="false"/>
      </Expr>
      <Expr http-header="user-agent">
        <Pattern expr="Mozilla" substring="true" case-sensitive="false"/>
        <Expr http-header="accept">
          <Pattern expr="text/html" substring="true" case-sensitive="false"/>
          <Pattern expr="*/*" substring="true" case-sensitive="false"/>
        </Expr>
      </Expr>
    </Condition>
    <Device category="WinCE Device" directory="handheld">
      <Condition>
        <Expr http-header="user-agent">
          <Pattern expr="Windows CE" substring="true" case-sensitive="false"/>
          <Pattern expr="Pocket PC" substring="true" case-sensitive="false"/>
        </Expr>
      </Condition>
    </Device>
    <Device category="Palm Device" directory="handheld">
      <Condition>
        <Expr http-header="user-agent">
          <Pattern expr="Palmscape" substring="true" case-sensitive="false"/>
        </Expr>
      </Condition>
    </Device>
  </Device>
</DeviceLibrary>
```

Figure 23

A  indicates that a client device needs to be authorised to be at this step.

S  indicates that the connection has to be secure for a client to be at this step

EFFICIENT SYSTEM AND METHOD FOR RUNNING AND ANALYZING MULTI-CHANNEL, MULTI-MODAL APPLICATIONS

CROSS-REFERENCE TO RELATED APPLICATIONS

This application is related to and claims priority to Assignee's co-pending provisional application Ser. No. 60/263,574 filed Jan. 22, 2001.

The present invention relates to multi-channel multi-modal applications, and more specifically to a platform for running and analyzing multi-modal multi-channel client-server applications.

BACKGROUND OF THE INVENTION

Computers are no longer large, expensive and centralized. This has allowed computing power to be distributed to a variety of systems, including those that may sometimes not be considered a traditional computer system such as personal desktop computers or network server computers. Recently, there has been prevalent growth in computing devices, such as smart phones, cellular phones, personal digital assistants (PDAs), intelligent 2-way pagers, in-vehicle computers, and information kiosks. These devices are becoming increasingly network aware, and are usable regardless of their location. This ubiquitous proliferation of computer processing power is sometimes referred to as pervasive computing, and is a dramatic paradigm shift from the era of mainframe computing.

The era of "anytime, anywhere access" has broadened the scope of possible applications and services. This new breed of applications can range from powerful business tools for mobile professionals to enriching services for consumers. For example, it is possible to conduct complex financial transactions during a train commute, make changes to travel reservations while traveling, deliver time-sensitive, location-specific discount coupons to a user in the vicinity of a department store, or even do comparison shopping right from the floor of a department store, all from a personal wireless handheld device. Today, corporations are using such initiatives to grow revenues, strengthen customer loyalty, increase employee productivity, and gain competitive advantages in the market place.

However, designing, deploying, and managing these multi-channel, multi-modal applications is complex and challenging. Rather than simply translating client-server, legacy, or web-based applications into the pervasive computing world, these new applications have to leverage certain unique characteristics. They should be personalized to deliver relevant and location sensitive information to each user, and should support several modes of operation such as "push," "pull" or "offline" modes. Further, the interaction capabilities of the client device, the display size, the speed of networking and the presentation primitives supported by each device is different, and should be accounted for.

Information access and application usage from different terminals in a variety of different channels and modes becomes extremely significant in the pervasive computing era of "anytime, anywhere access." As used herein, a "terminal" refers to a device that is operated by the user. It generally consists of an input device, such as a keyboard, a processing unit such as a CPU, a computer program such as a browser and an output device, such as a display screen or printer. In addition to the traditional networked desktop, a terminal can refer to other information appliances such as PDAs, Internet-enabled phones, handheld pads, 2-way pagers and voice recognition terminals. FIG. 1 illustrates how different access terminals 20a–c (e.g., web browsers) can be used to access the same applications 22 over a network 26, and further illustrates how applications 22 may access different types of data 28a–c stored at various remote locations.

A channel refers to the medium, or the "pipe" over which the interaction takes place. The main channels of access are: "wire-line" access over the Internet; "wireless" data access over cellular and other over-the-air networks; and voice access over analog PSTN networks. FIG. 2 illustrates how different access terminals 30d–h can use different channels 36a–c to access the same applications 32.

A mode refers to the way a user interacts with the application. Exemplary modes include real-time, disconnected, and asynchronous modes. In real-time mode, shown in FIG. 3, users request information from an online, server-side application 12 over the network 16. In disconnected mode, users 40 may interact with an offline application 42 and system 46 stored on a client device 44, as shown in FIG. 4. The user 40 may also connect to a synchronization application 41 on a remote computer system 49 through a conventional network 48 in order to update or synchronize data 47 by various methods. None of the data displayed is gathered in real-time, and the interaction is completely user-initiated. In asynchronous mode, the application 56 may notify users 50 of an event, pushing real-time data via alerts, and the users may choose to respond when they are available. FIG. 5 illustrates how alerts are pushed to a user 50. The alerts maybe triggered by an event 59 that is detected by an alert system 56 on a remote computer 58, and maybe pushed over a network 54 to the user's client device 52.

A "multi-channel application" is an application that can be accessed via two or more channels, including but not limited to wire-line access by web browser, wireless access by Internet-enabled phone, wireless access by PDA (Personal Digital Assistant), and voice access by telephone. The content and functionality may be the same or differ significantly across channels. For example, an individual may own a PDA, a cellular phone, and a computer, and may use all these devices to access the multi-channel application. However, the medium of access for all of these devices are entirely different—the desktop uses the Internet via TCP/IP, a cellular device, on the other hand, may use the Wireless Access Protocol (WAP) over a cellular network; while an analog phone uses the Public Switch Telephone Network (PSTN) to connect to a voice browser to access information. When users access information from these different devices, typically each device works independent of the other and there is no way to correlate the information together.

Current client-server programming models have been very successful in building traditional client-server applications delivered over the wire-line Internet, but lack the ability to scale to the new complexities of the multi-channel, multi-modal, multi-device world. As an example, consider a conventional application to handle stock trading. Traditionally, this application was available by talking live to a broker. With the advent of networking and pervasive computing, most financial institutions have been required to support several channels and modes of communication. For example, the application can be accessed over voice networks using an Interactive Voice Response (IVR touchtone)

system, or from a web browser on a desktop computer using the wire-line Internet. Thus, the application should be multi-channel and multi-modal.

Enterprise architects have tried to address these multi-channel multi-modal issues using a traditional client-server paradigm. One typical solution is where the application has separate server side components each addressing a single channel or mode. So in this case, there is a separate wire-line application, a separate voice application, a separate offline with a server side synchronization application, and a separate alerts application, all of which have to individually deal with the complexities of back-end integration and front-end client interaction. This method is a daunting task for enterprises since it increases the challenges for debugging, maintenance and monitoring of several different applications.

More specifically, consider the following desirable pervasive computing use cases of the exemplary stock trading application. First, users should be able to trade stocks from any device they own. The challenge is to support the different channels, screen sizes, interaction interfaces and output markup languages. The channels typically supported by the devices include wireline Internet, wireless data, and analog voice. The screen sizes may range from a full-functional color computer monitor, or a 4-6 inch color display of a PDA/smart phone, to a 2-4 line monochrome display of a WAP browser to a simple analog phone with voice output capabilities. The input interaction interfaces of the devices may include a combination of thumb wheels, touch screens with stylus, special buttons and speech input. The markup languages that the devices may support include Hyper Text Markup Language (HTML), Handheld Device Markup Language (HDML) and Wireless Markup Language (WML). Each of these differences can dramatically affect the design of an application.

Users should be able to perform transactions offline when there is no reliable network connectivity, and at a later time, when connectivity becomes available, synchronize to post saved transactions. Users should also be able to download personalized information and access it offline, for example on a PDA. This is typically relevant to intelligent "fat-client" devices that are more capable of local processing such as smart phones, laptops and PDAs. On these devices, an "offline" portion of the application may be made resident. Another back-end portion of the application may be resident on the server that is aware of synchronization requests from the client device.

Users should be able to setup and receive personalized alerts and be able to react based on the information delivered. This is relevant to terminals that have a mechanism to receive asynchronous notifications. The server application should support an asynchronous mode of operation to asynchronously notify the client device. Many notification delivery channels and formats should be supported including Short Message Service (SMS), wire-line Internet e-mail, outbound voice calls, and WAP alerts. Further, as a result of the alert, users should be able to connect back to the server and respond as appropriate.

Users should be able to seamlessly transact with the application over several devices and modes. If transactions are interrupted in one medium due to unreliable network or surrounding conditions, the user should be able to continue where he or she left off on a different medium. Typically, users carry more than one client device. For example, if a user is performing a transaction from a cellular phone, and the call is dropped; the application should be able to put him back to the same state when called again. Alternatively, the user should be able to complete the transaction from his desk using a desktop computer system over the Internet, if so desired.

Users should be able to engage in secure transactions remotely over wireless and wire-line networks. The application platform should provide a robust, reliable, secure and extensible environment. While there is not a single security solution for all devices and networks, the mobile applications platform should support the maximum-security possible given the configuration of networks and devices that the mobile applications will be deployed over. The server should also ensure transaction integrity in the cases of an abruptly interrupted session or dropped call. The application should also be able to switch between secure and unsecured states in the application without losing context.

In addition, enterprises have their own following daunting challenges. Enterprises should be able to easily add more use cases and be able to handle the increasing complexity of applications. A single application that deals with multiple modes and channels is very advantages from the point of central control and management. Adding a number of mode-specific and channel-specific use cases increases the complexity of applications. The application platform used should support paradigms that simplify the building and management of these complex applications. Mechanisms for componentization and re-use of pre-built components are desirable.

Enterprises must also be able to understand users' behaviors and constantly adapt to changing usage patterns. The platform might also have a data-mining module that tracks multi-channel, multi-modal usage. By tracking details, such as who is using the application, what parts of the application are most used, where users decide to leave the application, which transactions are never completed and what devices, carrier networks, channels and modes are most popular, enterprises can quickly adapt their applications to suit the needs of the users.

Further, to reduce ongoing software maintenance costs, a development environment should enable the separation of mobile presentation from business processes and data integration. Presentation of content can include voice prompts and data forms provided over multiple existing and new devices and mediums. Business processes can include workflows and processes, whereas data for the applications can come from enterprises' existing databases, packaged applications, and legacy systems. With separation of business processes, presentation design, and data source integration, the business processes of an application do not need to change if a new browser, device, mark-up language, or wireless network is introduced. This separation allows businesses to quickly adapt applications to new devices, data sources and business processes.

Thus there is a need for a platform to specifically address the problems of deploying multi-channel, multi-modal applications. It is to these ends that the present invention is directed.

SUMMARY OF THE INVENTION

A system for developing, running and analyzing multi-modal applications includes a development platform, a run-time engine, and a data-mining module. Once a mobile application is built and tested on the development platform, it can be automatically deployed on the run-time system, which maintains and manages the application. Further, the data-mining system allows access to reporting and analysis tools that aid in understanding end-user behavior and preferences. This data can be used to further enhance applications by redesigning and redeploying them in a rapid and efficient manner.

In one embodiment, the development platform is preferably a visual development environment for rapid and integrated development and deployment of mobile data and voice applications. The development platform is described in detail in Assignee's patent application Ser. No. 10/054,623, entitled SYSTEM AND METHOD FOR BUILDING MULTI-MODAL AND MULTI-CHANNEL APPLICATIONS, filed concurrently, and incorporated herein by reference in its entirety. Briefly, the development platform preferably utilizes a unique drag-and-drop interface with a library of reusable and customizable templates and components, and integrated voice capabilities. Further, the development system enforces a robust design methodology called the "Model-View-Controller" (MVC) paradigm for building applications that allows developers to separate the aspects of application design: (1) integrate data sources, (2) define business processes and workflow, and (3) customize presentation to any client device. The output of the development system (an "application descriptor") contains a persistent embodiment of the application design.

In an embodiment of the invention, the run-time system provides a robust environment designed for executing multi-channel, multi-modal applications. The input to the run-time system may be an application descriptor or project that is created either programmatically or using a visual development environment. These application descriptors or projects are preferably MVC-based, as enforced by the development system. The run-time engine provides a single, comprehensive architecture for delivering such applications and services over multiple channels and modes of operation. The run-time system is based on standards and implemented using extensible Markup Language (XML) and Java in computer software executing on a desktop, network server computer or pervasive computing system. However, alternative embodiments may be based on differing standards without departing from the invention.

The invention supports techniques for handling large and complex applications, such as "Adaptive n-dimensional workflow control," a method that allows certain portions of the application to be enabled or disabled dynamically as deemed necessary. Sub-models, or sub-controllers offer a technique to hierarchically encapsulate entire portions of applications. With the ability to control applications during execution based on these two aforementioned techniques, the run-time system conveniently manages large applications, such as those with hundreds of business processes and client user interactions.

An advantage of the invention is that it allows the servicing of multiple client devices including wire-line Internet enabled desktops, wireless cellular phones, smart phones, networked PDAs and voice phones. The run-time system detects the client device at the time of connection and delivers the correct formatted response appropriate to the device based on the channel, device screen size, connection speed and markup language that the device supports. This technique is henceforth referred to as "adaptive rendering."

The invention also affords a method and apparatus for handling interrupted transactions seamlessly across multiple channels and modes. Preferably, each subscriber is identified uniquely when connected to the application from a variety of different device types, and is presented with a personalized interface regardless of which channel or mode connected from. Preferably, the system journals the transactions and persists required memory objects, such that when calls are inadvertently disconnected during an interaction session, and the user re-connects from any of the registered access devices, the user is identified and is presented with an option to continue from the previous point of execution. The interrupted transaction may be continued even from a device of a different medium. Further, the invention offers a mechanism to handle requests from the client device, during the same session, that are out of context. Preferably, the system maintains knowledge of the user's navigation through the states of an application, such that if the user inadvertently navigates backward using the client device's locally cached pages, and posts a request that is out of sequence, the system becomes aware of this and knows how to send the appropriate response. Further the invention also offers a mechanism to handle switching between secure, authorized and normal states during a transaction. Preferably, users may switch between a non-secure part of the application to a secure part of the same application, or vice-versa, seamlessly. Further, certain areas of the application may be restricted, and require some extra permissions to access. Preferably, only authorized users may traverse to certain portions of the application. These may be used in combination as may be required by an application.

Additionally, the data-mining system functions as a business intelligence tool designed to report and analyze transactional data. Briefly, it enables reporting for wireless sites and obtains raw data for data-mining purposes. Accordingly, the performance of wireless applications can be evaluated and user-behavior can be analyzed to improve the mobile applications. An advantage of the data-mining system is analyzing navigation patterns of end-users through a multi-channel multi-modal application, and provide an extensible mechanism to analyze multi-channel multi-modal characteristics such as client device characteristics, network and channel characteristics and user behaviors across channels.

BRIEF DESCRIPTION OF THE DRAWINGS

The details of the invention, both as to structure and operation, and further advantages, can be better understood by referring to the accompanying drawing in conjunction with the following description.

FIG. 23 is a sample device tree defined in XML.

DETAILED DESCRIPTION OF THE PREFERRED EMBODIMENT

The present invention provides a system and method for developing, running and analyzing applications. More specifically, it provides a system for running multi-channel, multi-modal applications. Preferably the invention is based on Extensible Markup Language (XML) and Java standards; however, alternative embodiments may be based on differing technologies without departing from the invention.

Figure 1:
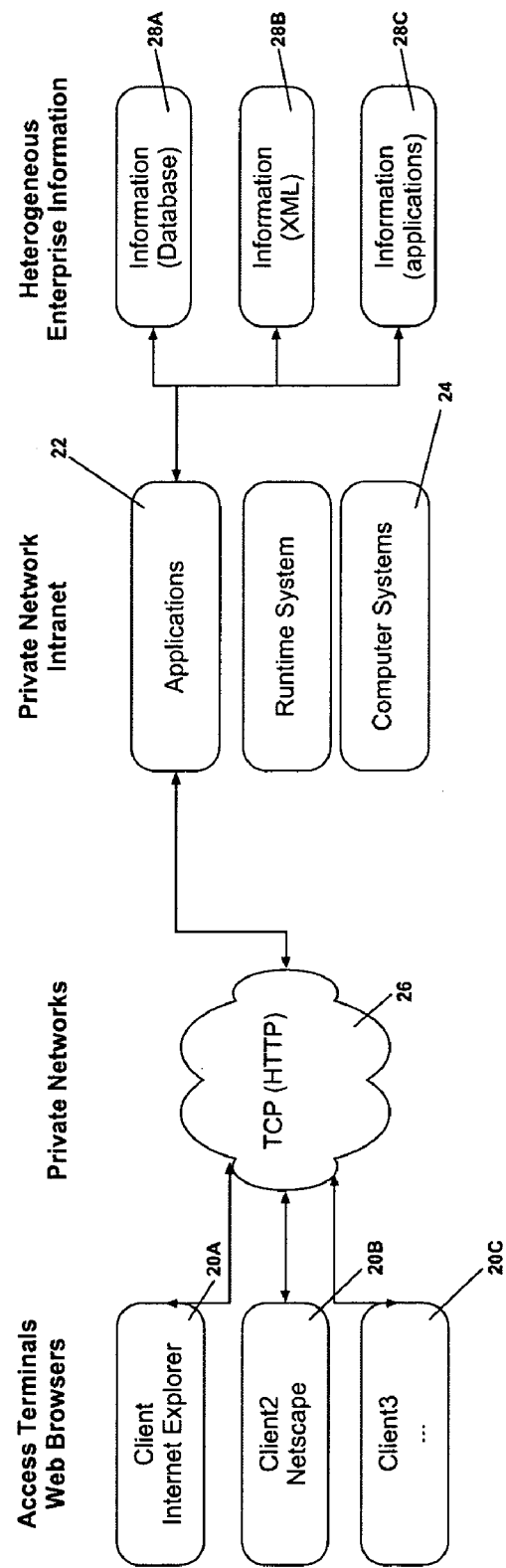
FIG. 1 is a block diagram illustrating the use of different terminals by clients to access the same application, in real-time mode, along wire-line channels.
Figure 2:
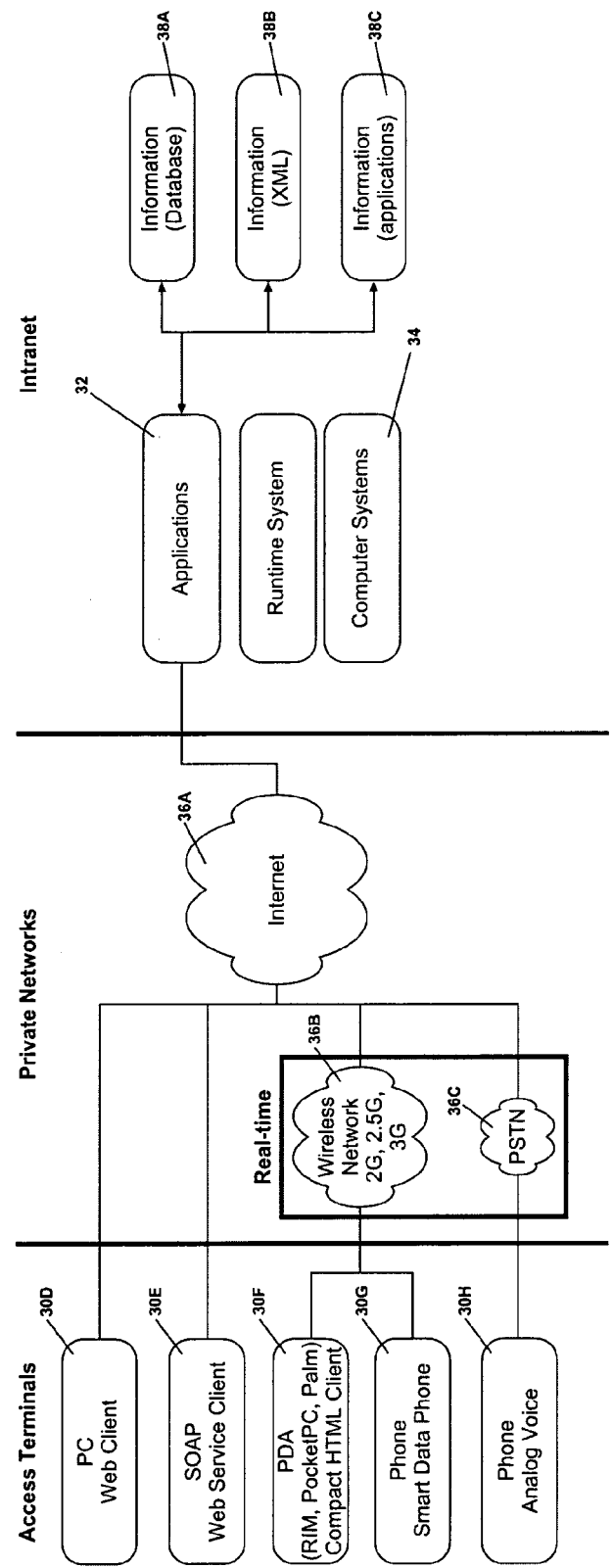
FIG. 2 is a block diagram illustrating the use of multiple terminals to access the same application via multiple channels, all in real-time mode.
Figure 3:
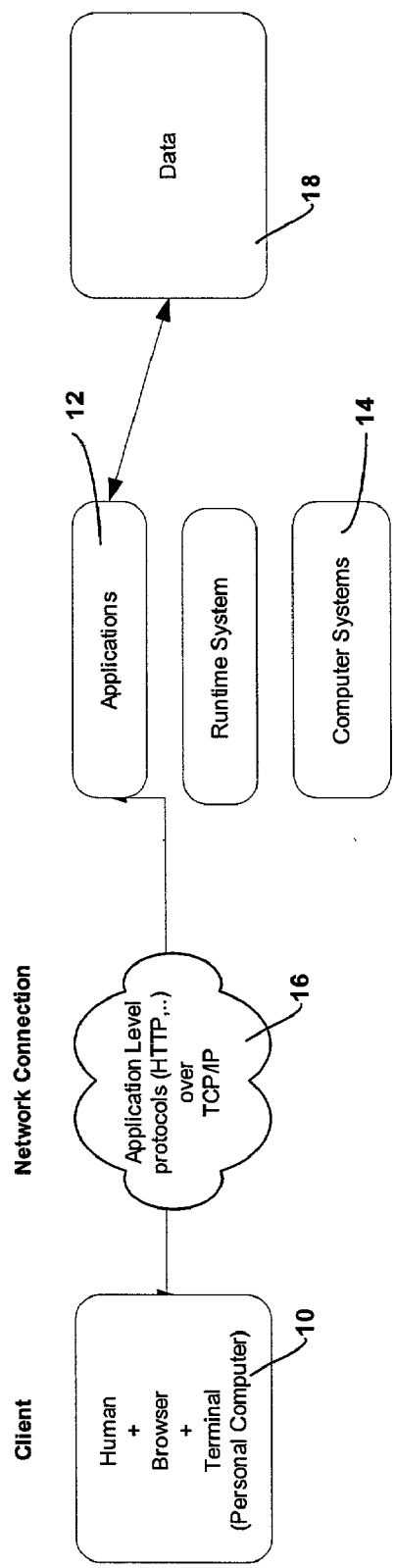
FIG. 3 is a block diagram illustrating the current client-server computing paradigm, in real-time mode.
Figure 4:
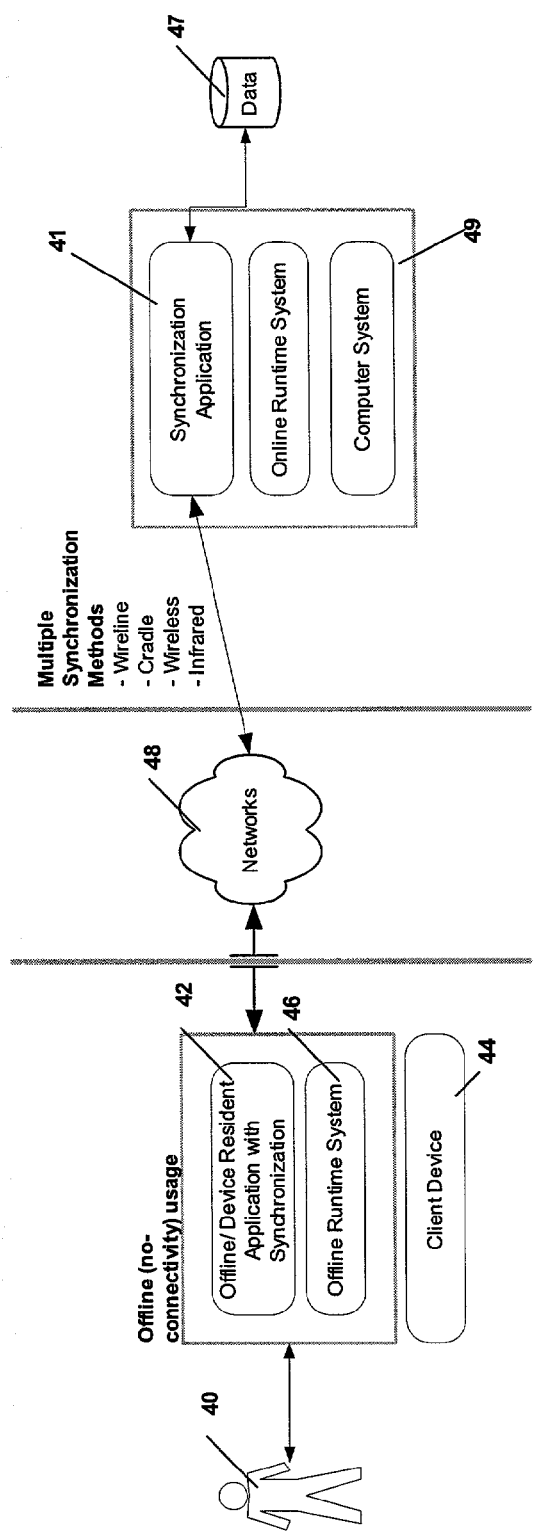
FIG. 4 is a flow diagram illustrating client-server interactions when users access an application in disconnected mode, using offline client devices.
Figure 5:
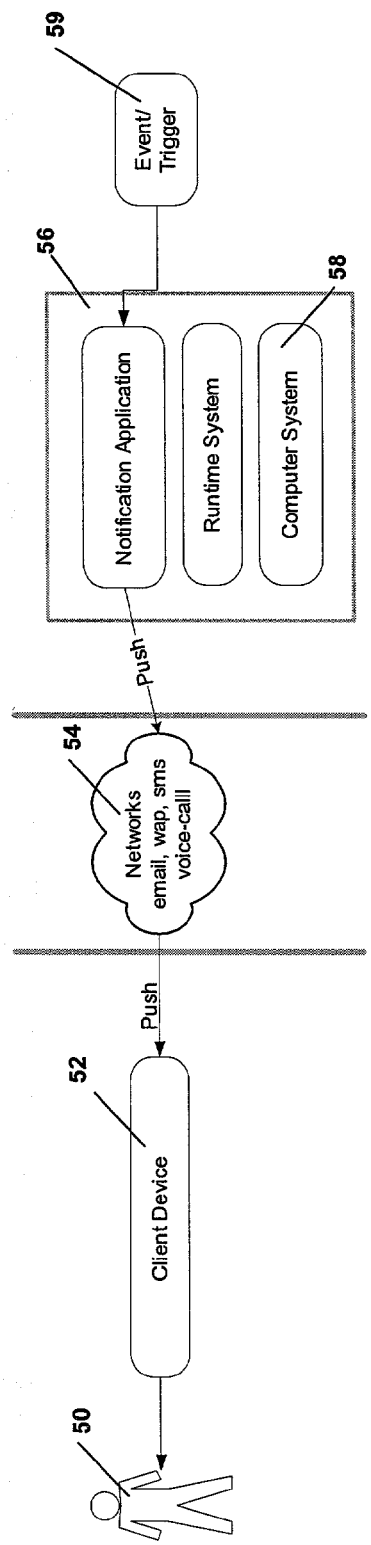
FIG. 5 is a flow diagram illustrating how alerts are pushed to users in asynchronous mode, in accordance with the subject invention.
Figure 6:
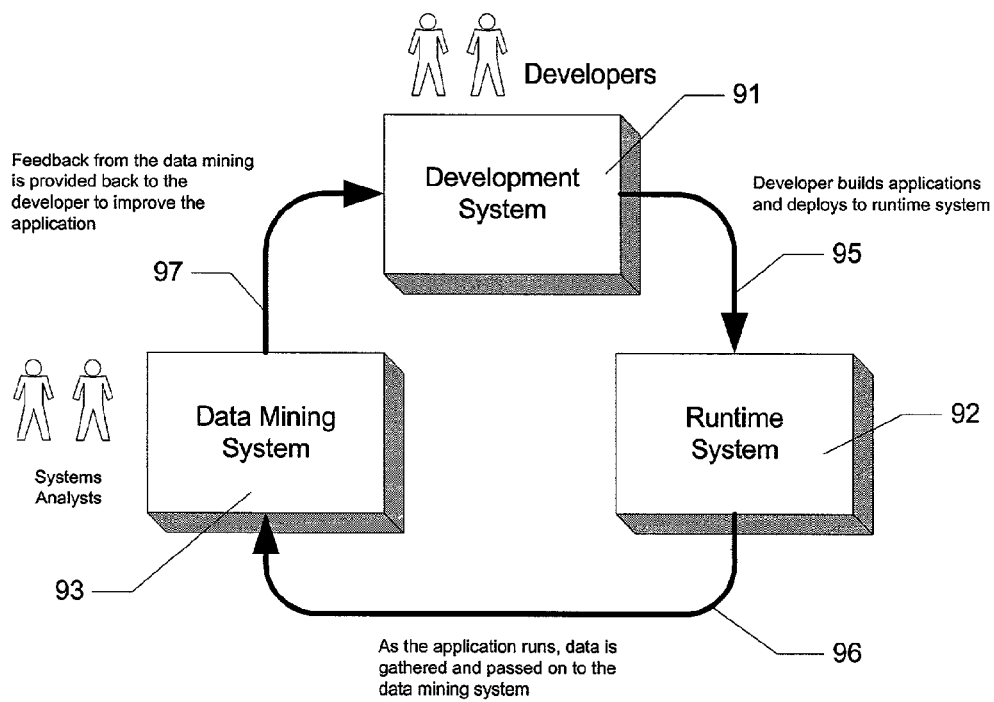
FIG. 6 illustrates a preferred methodology of building applications using a development system, executing them on a run-time system and analyzing them using the data-mining module.

FIG. 6 illustrates an embodiment of the invention. As shown, there are several primary components, including a development system 91, a run-time system 92 and a datamining system 93. In one embodiment, the development platform is preferably a visual development environment for rapid and integrated development and deployment of mobile data and voice applications. Developers may use the development system to create applications and deploy them on to the run-time system 92. The run-time system provides a single, comprehensive architecture for delivering multi-channel applications and services operating in several modes. The data-mining system 93 may be used by system analysts to gather and analyze information generated by the run-time system generated during the execution of the applications.

The development platform is described in detail in Assignee's patent application Ser. No. 10/054,623, entitled SYSTEM AND METHOD FOR BUILDING MULTI-MODAL AND MULTI-CHANNEL APPLICATIONS, filed concurrently, and incorporated herein by reference in its entirety.

By integrating with existing information systems and repositories, the run-time system effortlessly extends applications to the wireless world. These complex processes can be delivered to and optimized for any wireless device by embracing evolving mobile technologies and standards, including voice-only phones, web-enabled phones, pagers, Personal Digital Assistants (PDAs), and other handheld devices. While the following discussion includes a description of the present invention being used for the creation and execution of multi-channel (e.g., voice and data) applications, multi-modal (e.g. online, offline, asynchronous) applications, it should be appreciated that the present invention may be utilized to develop any type of application.

Figure 7:
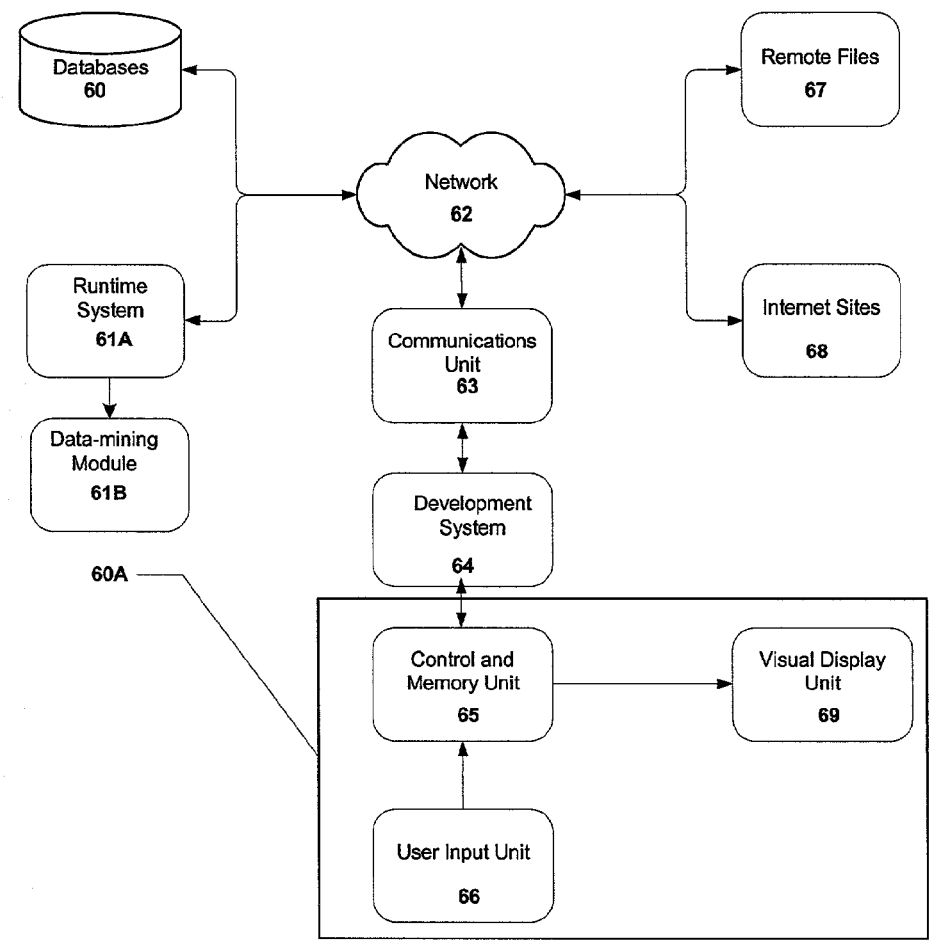
FIG. 7 is a block diagram illustrating a system for building application implemented within a computer system in accordance with a preferred embodiment of the present invention.

The invention is preferably practiced in the context of a computer system with an operating system. FIG. 7 shows a representative hardware system 60A, which is implemented on a computer system in accordance with the present invention. The system 60A may represent a conventional and commercially available computer system or an independent microprocessor-based system built specifically for use with the present invention. Specifically, examples of the system 60A not only include desktop computers and networked computer servers, but also include handheld computers such as smart phones and PDAs, which have these components.

The system 60A comprises a control and memory unit 65, a user input unit 66, a visual display unit 69, and a communications unit 63. The control and memory unit 65 may be a conventional and commercially available processor-based system or network server including a microprocessor, volatile and non-volatile memory, and one or more persistent storage devices. In the preferred embodiment, the control and memory unit 65 is adapted to and may store at least a portion of the operating software, which directs the operation of system 60A. Alternatively, the present invention may be partially or wholly stored on a remote or disparate system, device or network, and may be accessed and loaded into control and memory unit 65 by way of user input unit 66 and/or communications unit 63.

The user input unit 66 may include one or more conventional and commercially available devices adapted to allow a user to provide data to, and access data from, the control and memory unit 65, and may comprise, without limitation, a user input assembly such as a keyboard, mouse, or touch pad. The user input unit 66 may further include other conventional peripheral devices such as disk drives, printers, scanners and the like. The display unit 69 may be a conventional and commercially available device for allowing the system to display visual data to a user, such as a computer monitor, a flat panel display or other conventional display device, which is suitable to display output generated by a computer system. It should be appreciated that the user input unit 66 and the display unit 69 cooperatively permit a system user or operator to enter and/or modify data within the system, to control application with the system 60A, to access data from the system 60A, and to perform system maintenance, management and modification.

The communications unit 63 may be a suitable and commercially available device or a combination of devices for transferring data over a network 62, such as a global communications network (e.g., the Internet, wireless networks) or a computer network. The communications unit 63 allows the system to send requests, receive responses, accept remote deployments of applications, and to access data from remotely located files 67, databases 60 and internet sites 68 for use in the application building process. Any communication protocol compatible with the communications unit 63 may be used. Typically, the protocol used by the communications unit 63 to communicate between clients and other external processes is TCP/IP.

Referring again to FIG. 6, the functional units of the invention, the development system 91, the run-time system 92 and the data-mining module 93 are preferably practiced in the context of a computer system as described in FIG. 7. Alternatively, the development system 91, the run-time system 92 and the data-mining module 93 may also be resident on separate computer systems. The communication between the systems is possible over a standard computer network such as the Internet or a local area network within the enterprise. Typically, a team of developers uses the development system to design and develop the application.

In one embodiment, the development platform 91 is preferably a visual development environment, described in detail in Assignee's patent application Ser. No. 10/054,623, entitled SYSTEM AND METHOD FOR BUILDING MULTI-MODAL AND MULTI-CHANNEL APPLICATIONS, filed concurrently, and incorporated herein by reference. Developers use the development system 91 to build applications and deploy them to the run-time system 92. Briefly, the development system 91 enforces a standard paradigm for building applications where the presentation and user interface design is separated from the business process design and the back-end data integration design.

The presentation design focuses on the user interface aspects of multiple channels and devices and results in a set of view templates. These view templates may also contain dynamic data that is enumerated by the run-time system when the application is executed. In the MVC paradigm, for example, this refers to the "view" design.

The business process design involves defining the structure of the application. This application structure is represented as a set of state-models (also referred to as interaction workflows) that together comprise the possible states that the application can exist in and the navigation and processing between those states. In the MVC paradigm, for example, this refers to the "controller" design.

The back-end data integration design involves implementing business objects and data specific to the processing of the application, and interfacing with external enterprise information systems. The term back-end has a very general meaning and includes any software or hardware that provides data required for the execution of the application. In the MVC paradigm, for example, this refers to the "model" design.

For the sake of clarity, MVC-based applications designed on the development system will be generally referred to herein as state-based applications, workflow based applications or process-based applications. The visual development system will henceforth be referred to as Studio.

The run-time system 92 provides a comprehensive infrastructure for executing these state-based applications. It consists of modules and interfaces that make it possible to support any kind of client devices using any combination of development languages or input formats.

In order to successfully manage and maintain a multi-channel application, an enterprise needs to monitor the performance and usability of the application and constantly improve it. The run-time system 92 is designed to monitor running applications in real time, set alert conditions, and send alerts immediately. Through a web-based interface, administrators can gain global control and visibility of the status of all critical subsystems and processes. For remote system monitoring, the run-time system 92 sends multiple system alerts to notify administrators of any specified issues. In addition, the run-time system 92 provides administrative tools that enable the starting and stopping of servers, and selecting and monitoring of the resource configurations and is capable of logging all transaction data such as user identification, terminal device characteristics, and channels. The application log data 96 is gathered and passed on to the data-mining module 93.

The data-mining module 93 is capable of converting the application log data into a more suitable form for performing analysis. System Analysts may use the data-mining module 93 to obtain specific results regarding the usage of the applications. Feedback 97 from the data-mining module 93 is provided to the developers to enhance the application design. With the effective use of this system it is thus possible to shorten the product development lifecycle.

Figure 8:
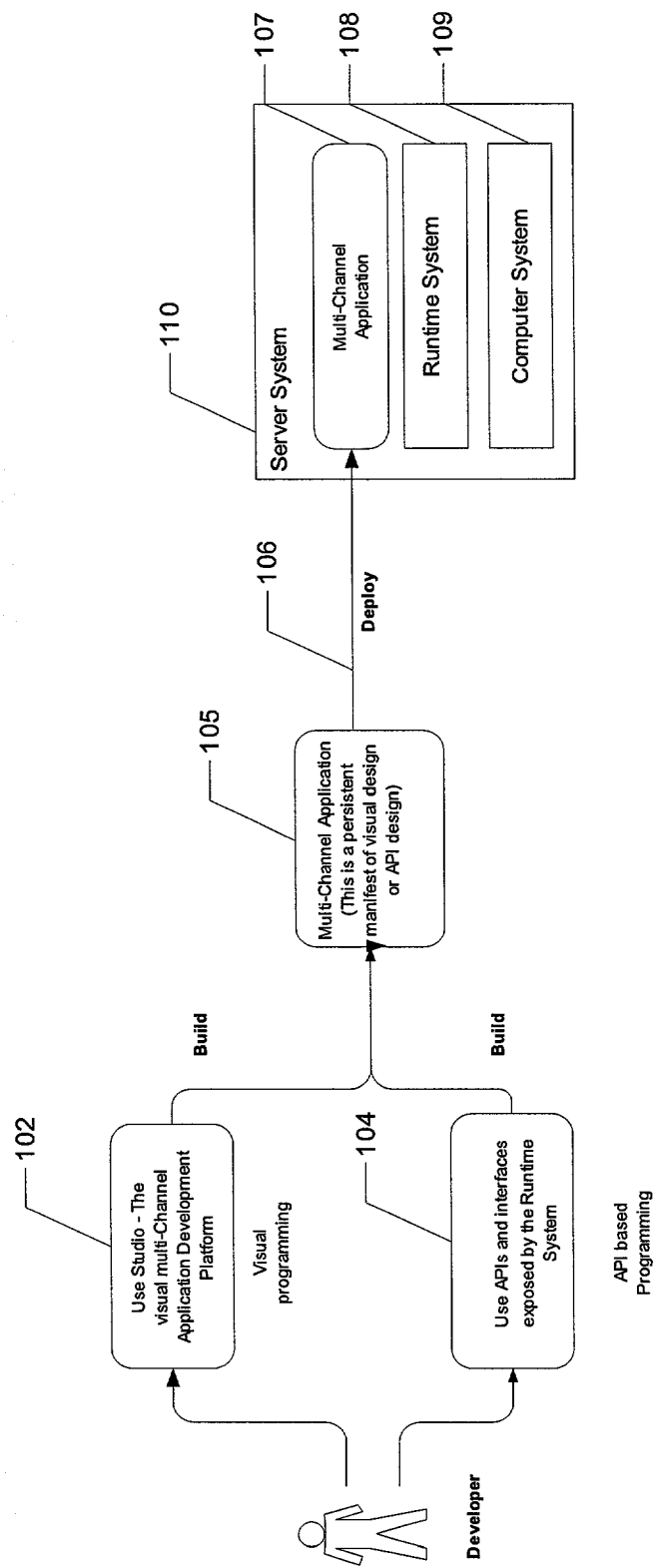
FIG. 8 is a schematic diagram of the process of building applications and deploying them on the run-time system of the current invention.

The process of building applications is further described with reference to FIG. 8. Preferably, two different methods are shown in the figure. The term "application model" or project will be used to represent the persistent embodiment of an application design task. Task 102 shows a developer using a visual paradigm with a system such as Studio to build an application model 105. Task 104 shows a developer using a framework exposed by the run-time system 108 to implement the same application model 105 using a programming paradigm.

In an embodiment, the run-time system 108 is capable of executing both developed application models. Reference number 106 shows the development system deploying the application model on to the server system 110. The server system 110 may comprise a computer system 109 on which the run-time system 108 is also installed. Reference number 107 is the deployed application on the server system.

It is important to note that the development system defines the criteria for applications that are capable of being executed on the run-time system, and the process of deployment. Once these applications are debugged and tested, they may be deployed on to the run time system.

Figure 10:
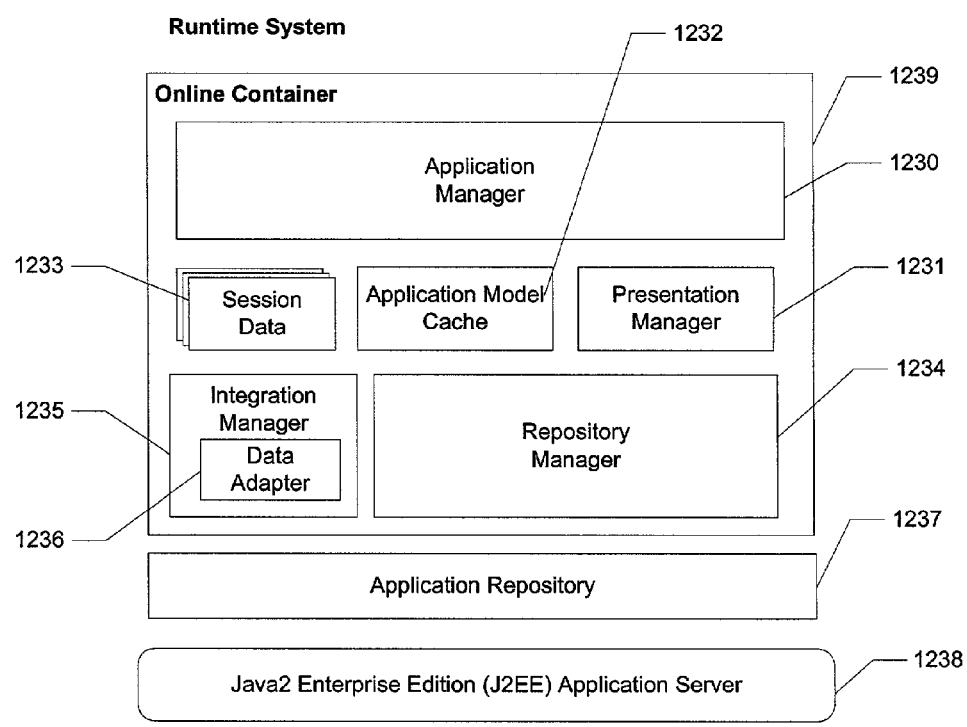
FIG. 10 is a schematic block diagram of a preferred online embodiment of the run-time system of the current invention.

FIG. 10 illustrates the run-time system 92 in more detail. The components in accordance with the preferred embodiment may reside on a computer system that controls all access to its resources including processor time, file system storage, networking input and output. Client devices or terminals can access the run-time system 92 over a network connection.

The run-time system can be implemented both as an online embodiment and an offline embodiment. Both systems preferably depend on the underlying operational environment specific container for session management. Blocks 1230 through 1239 illustrate the components of a run-time system 92 implemented in the context of an online container. Block 1239 is an online container that acts as an external wrapper to isolate the application manager 1230 from the specifics of the environment it runs in. The online container is also responsible for mapping the execution query from the environment specific form to standard form defined by content of the session-data, and also maps user requests to the corresponding session-data 1233. If a user request does not have a session-data associated with it, then a new one is created and initialized.

An application manager 1230 is responsible for coordination of user query execution by pulling controllers and views from the model repository. It is also responsible for handling data access interfaces between controllers and views and performing state transition operations. The application manager 1230 allows the separation of the controller and view into two independently manageable entities such that details of the implementation of controllers or views may be changed without affecting the other.

Run-time session-data objects 1233 are maintained for each session and act as the liaison between the application manager 1230 and the environment, and manage persistence of the objects used by the application. Use of session data 1233 allows the application manager 1230 to be used in any environment. To run the application manager 1230 in any environment, an implementation of the session data specific to that environment is created. For example, for the online embodiment (i.e., J2EE environment), the session data leverages J2EE session management capabilities. To simplify separation of data with different contexts, session data uses the concept of "data scope," which has several advantages including flexibility for separation of data coming with a user request, device specific data (such as header values), and data for certain scope of current context: state scope, sub-model scope, and global scope. Another advantage is flexibility in data lifetime management. Using a corresponding context scope, the length of time a particular data item lives can be specified by the developer. For example, if the developer allocates a data object in the sub-model scope then this item will be deemed nonexistent outside of this sub-model. This is not only useful in partitioning and encapsulating user objects, but also enhances memory utilization, since objects are instantiated only in the contexts they are allocated in.

The application model cache 1232 is a set of state-controller and state-view objects that constitute workflow models of an application. This component improves performance of the run-time system 92 by caching the state-controller and state-view objects. The application model cache 1232 achieves this by storing two maps, one containing the mapping between a state-name and the corresponding state-controller and the other containing the mapping between a state-name and the corresponding state-view.

The presentation manager 1231 is responsible for generating multi-channel output to the device. One of the main responsibilities of this component is translating application presentation templates to optimized device specific markup information that is supported by the target client device. It uses the concept of "adaptive rendering" technique, which involves device detection and corresponding content generation.

The presentation manager 1231 is responsible for generating multi-channel output to the device in an online embodiment of the present invention. Further, the presentation manager 1231 enumerates any dynamic data tags in the presentation template. It supports interactions with virtually any type of tagged language formats such as XML, XHTML, HTML, VoiceXML, WML, etc., and responds with the appropriate content.

Figure 9:
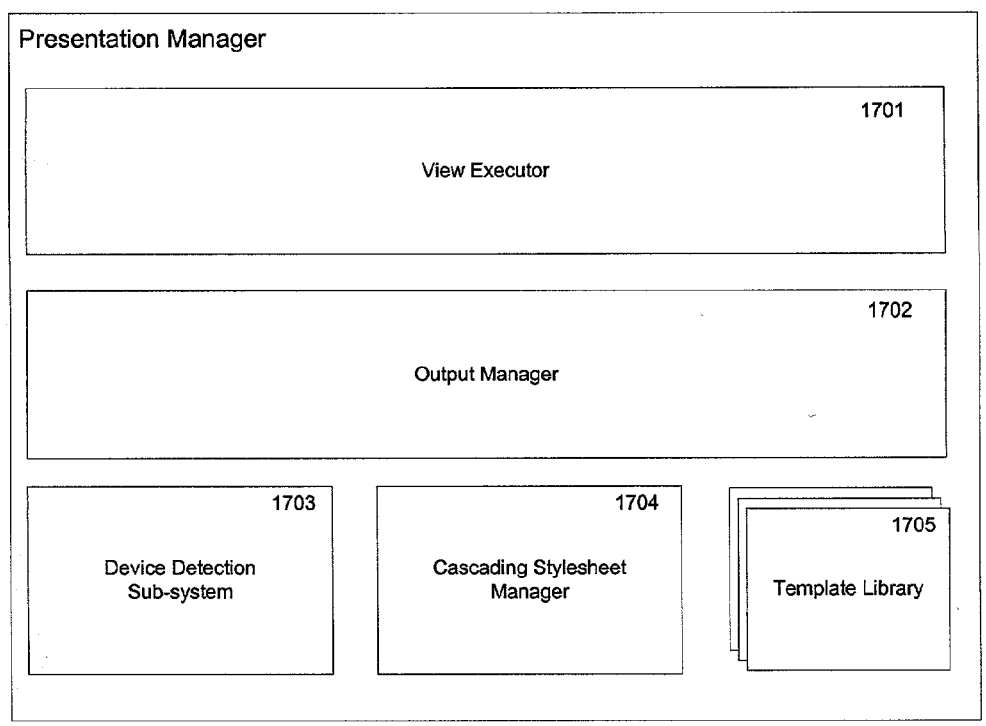
FIG. 9 is a schematic block diagram of the sub components of the Presentation Manager component of the current invention.

FIG. 9 illustrates the various components that comprise a preferred embodiment of the presentation manager. It is responsible for detecting device types, and formatting and presenting content that is optimized for the requesting device. A view executor 1701 executes the view that generates content optimized for the requesting device. An output manager 1702 pipes the output from one view into another based on view types. A Device Detection Subsystem 1703, hereinafter DDS, handles the responsibility of detecting device types based on the request parameters. Cascading stylesheet manager 1704 and template library 1705 assist the presentation manager in the process.

The presentation manager can automatically detect device specifications and deliver tailored content in real-time. The presentation manager also includes an intelligent component (XHTML View) that takes individual visual templates defined by developers for a specific session state and dynamically generates the necessary device interfaces using predetermined rules defined in XSL. By intelligently and automatically detecting a device type and its characteristics, such as client browser types and supported image types (Device detection is explained in detail later in the document), the presentation manager can dynamically generate content optimized for the requesting device's characteristics (i.e., the content is formatted to best suit the requesting device's capabilities). If the device detected is a new device, the presentation manager will render valid content to the device by falling back to the closest possible match for that device. Thus, the presentation manager component replaces the need for developers to create multiple visual templates for a single user interaction due to varying device form factors and capabilities.

The input to the presentation manager is a presentation template. The presentation manager can handle outputs of two kinds of development methods to build presentation templates—(1) Universal approach, which is a massively efficient one-to-many approach that automatically transforms individual xHTML based presentation templates into many device specific markup languages; and (2) Specific approach, which is a high control few-to-many approach that allows for creation of presentation templates either in xHTML or device native markup language. The presentation manager content can be generated for almost all real-time devices using a combination of the above two approaches and the rendering technologies supported.

Referring again to FIG. 10, the integration manager 1235 manages creation and initialization of user objects by providing a framework of object wrappers. An Object wrapper is a flexible mechanism for instantiation of user objects realized through the use of a specialized object wrapper for each particular type of object such as Java Bean, EJB or Data Adapter. Each of these object wrappers contains information necessary to create new user objects and initialize them with predefined values. Integration manager object wrappers use different means to initialize created objects. For example, Java Beans can be initialized from serialized images, and EJB wrappers can use different directory services to locate the necessary EJB and connect to it.

The data adapter 1236 is a particular instance of a user object that is responsible for providing access to external services such as databases or Web-services. The main difference between a data adapter 1236 instance and other user objects is that a data adapter 1236 instance has a reference to the session data 1233. This enables the data adapter 1236 to access other objects in the session and use their values for interactions with external services.

The repository manager 1234 manages access to application resources such as images, and locale specific string translation tables. Use of this component enables isolation of application storage details from other components of the run-time system 92. One of ordinary skill in the art will appreciate that this isolation also enables one to create multiple implementations of the application storage without departing from the current invention.

The application repository 1237 holds the persistent manifest of applications designed using a visual design environment or using Application Programming Interface (API).

Block 1238 is an example of a preferred environment that is responsible to provide the online container 1239 required for the run-time system.

In the online preferred embodiment of the run-time system, a client device accesses the application and run-time system running on the server system over a network. The client device may be any terminal, such as cellular phones, PDAs, smart phones, mobile computers, laptops, pagers and wire-line connected desktop computers. The network encompasses all the different networks and is used to represent any wide area or local area network that a client device may use to communicate with the server system. For example, a user may use her cellular phone to call the system and interact with it using her voice, or use her wireless data capable (e.g. WAP enabled) smart phone to access the same server system using wireless data networks, or use an internet enabled wire-line desktop computer system with a web browser. Further, she may be alerted on her pager device by the server system over paging networks. The server system is preferably a networked server system with a controlling operating system. In the preferred online embodiment, the run-time system is implemented in the Java Programming environment.

The client device contains a client application, which is preferably a browser application that is capable of submitting requests and displaying responses from a server system. In a typical client-server interaction, the browser application, or equivalent thereof sends a client request to the server system over the network. The server system processes the request and returns a response that is specifically formatted for the device. Client devices may be engaged in a session with the server system and submit multiple requests in sequence.

Figure 11:
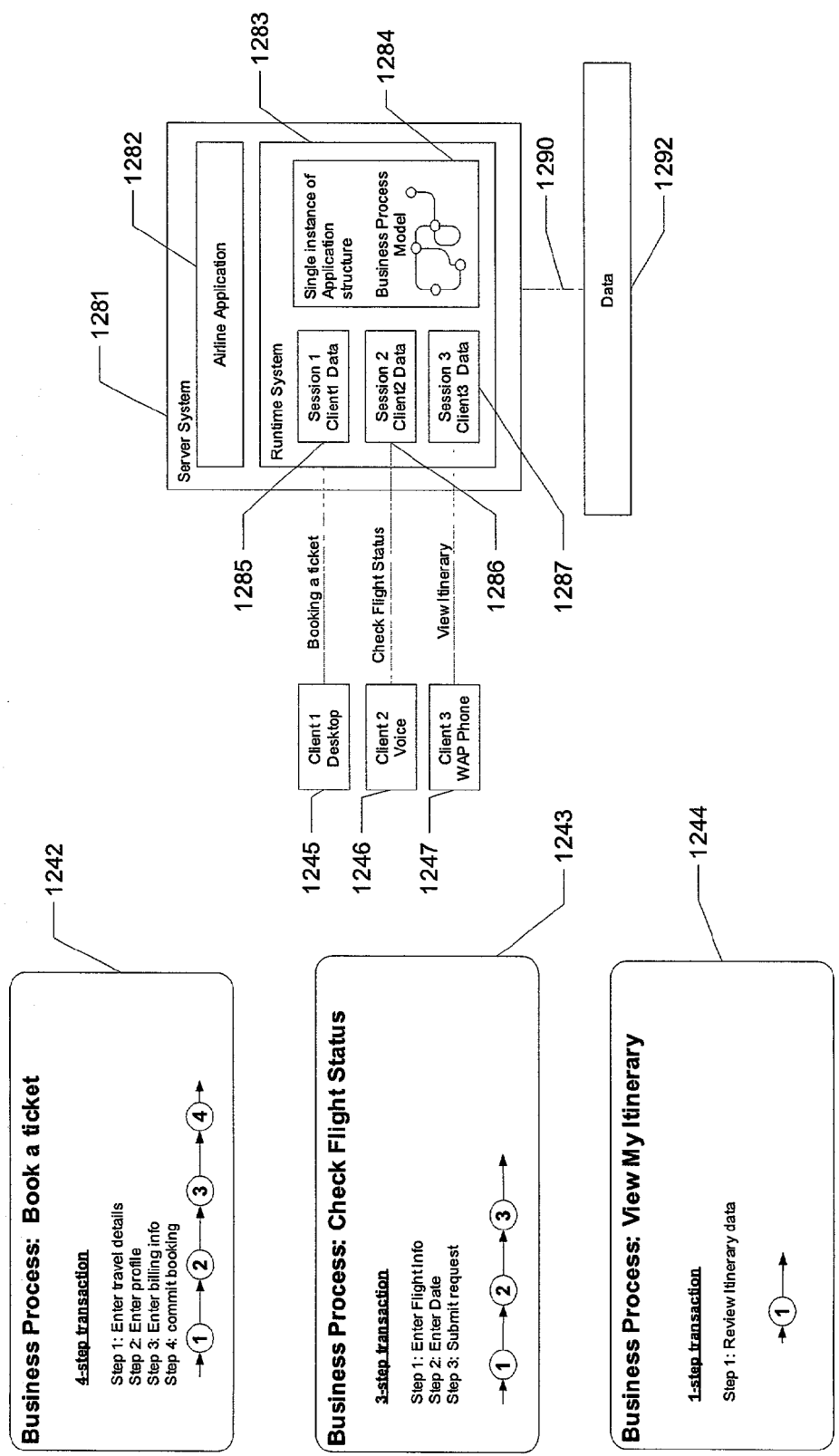
FIG. 11 is an exemplary multi-channel airline reservation example that uses the current invention's preferred online embodiment.

To further elucidate the preferred online embodiment specified thus far, an exemplary multi-channel airline reservation application is described in FIG. 11. This application 1282 is executed by the run-time system 1283, which is resident on a server computer system 1281. It allows users to login and then perform tasks (also referred to as business processes) related to airline reservations. For simplicity, the application allows the following three tasks:

Users are able to retrieve flight status: This is a 3-step transaction as illustrated by 1243. Users first enter the flight information, then the date and time of the flight, and then submit the request. For the sake of simplicity, the user interface for the application is not described here on the voice, WAP or Web channels.

Users are able to make airline bookings. This is a 4-step transaction as illustrated by 1242. Users enter the flight information, including flight number, date and time, then the traveler information, then the billing and payment information and then further proceed to commit the request.

Users are able to retrieve their itinerary and view it. This is a single step transaction as illustrated by 1244.

Many users from different channels may simultaneously access the same application using client devices such as a voice phone device 1246, a WAP-enabled data device 1247 or a personal desktop computer 1245, and be accessing different parts of the application.

FIG. 11 shows a snapshot of the system when client 1245 is booking a ticket, client 1246 is checking flight status and client 1247 is viewing her itinerary. The run-time system 1283 maintains a single instance of the application structure 1283 including a run-time memory image of the business process model. It also maintains separate instances of the session-data between each user client. 1285 is the session-data for client 1 booking a ticket using a desktop PC; 1286 is the session-data for client 2 checking his flight schedules using a voice phone and 1287 is the session-data for client 3 viewing her itinerary using a WAP enabled mobile phone. The run-time system maintains user specific information in these session-data instances created for each user. Session-data stores user data and current state information. Further, session-data has access to external data 1292 via the Data Adapter 1236 as described in FIG. 10. Thus, in this example, the application running on the online embodiment of the run-time system is able to service requests from such heterogeneous devices simultaneously.

Figure 12:
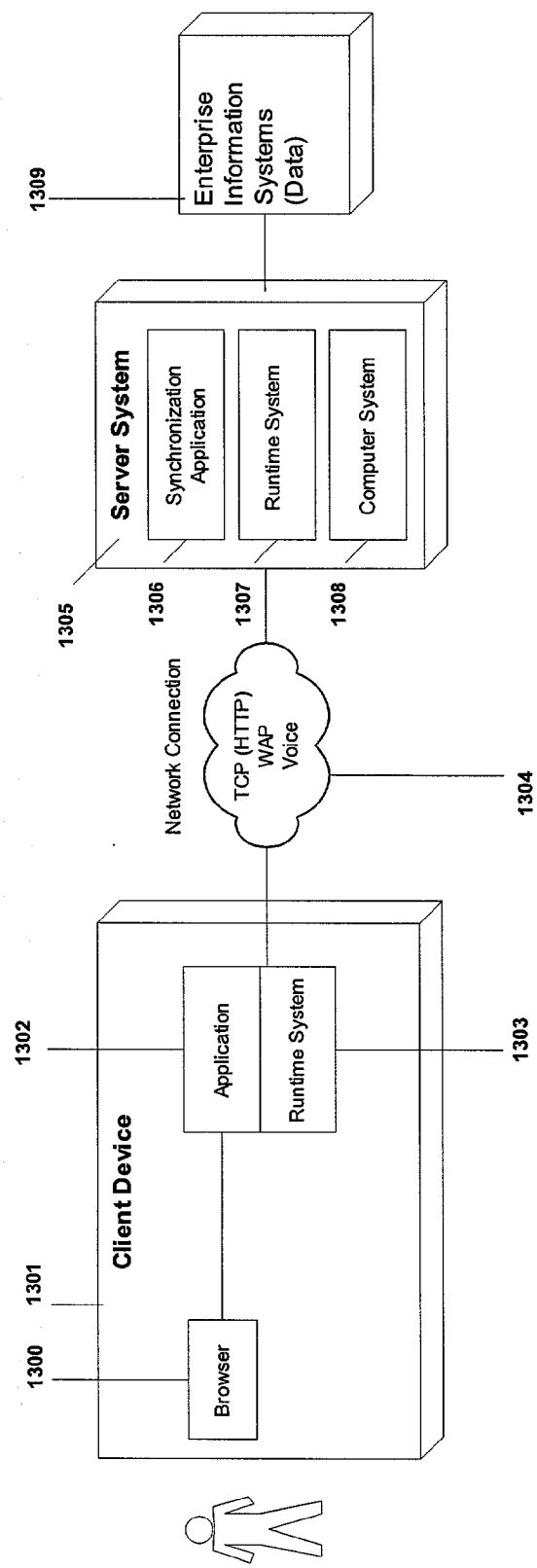
FIG. 12 is a schematic block diagram describing the architecture for an offline embodiment of the run-time system.
Figure 13:
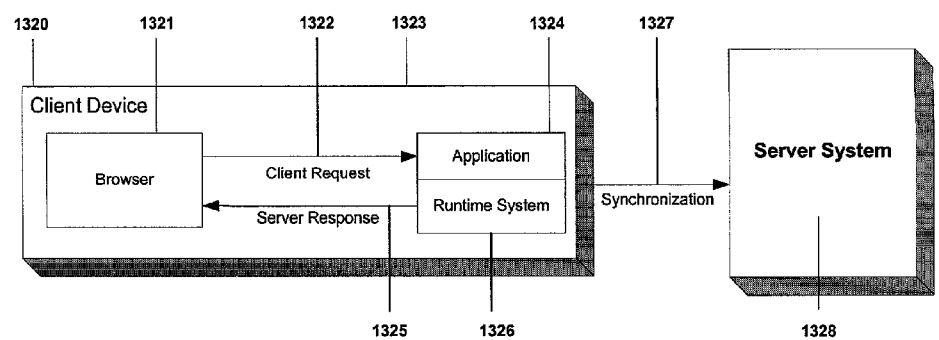
FIG. 13 is a flow diagram showing the communication process between the applications inside the client device, and the communication between the client device and the remote server system using the current invention.

In an alternate embodiment, the run-time system can be practiced in a mobile computer as shown by FIG. 12. With the popularity and increasing acceptance of powerful portable computing devices, it is possible to have the run-time system embedded on such a computer system. A representative client device 1301 may include a browser application 1300 and an embodiment of the run-time system 1303, in accordance with the invention. An application 1302 has been deployed on this client device and communication similar to the request and response communication described can occur between the browser client 1300 and locally resident run-time system 1303 without the need for an external network 1304. Such applications that reside on the client device may either run in isolation of the network, or sometimes be connected to a server system. Preferably, they may communicate with a networked server system 1305, which may include a synchronization application 1306, a runtime system 1307 and a computer system 1308, for the purpose of synchronization with the server system. The run-time system 1303 communicates with the server system 1305 (which in turn may communicate with enterprise information systems 1309) using the request-response communication described. In FIGS. 12–13, the server system 1305 includes an embodiment of the online run-time system. However, alternate embodiments of server systems that may comprise standard external components including applications, web servers, and application servers may also be used.

FIG. 13 illustrates the concept of synchronization for the alternate offline embodiment. Preferably, applications running on a mobile computer 1320 may need to synchronize their local data with centralized data on the server. While the typical interaction is between the browser 1321 and the application 1324 running on the run-time system 1326 using client request 1322 and server response 1325, the application may also perform a synchronization operation 1327 over a network with a remote server system 1328. The function of synchronization is typically provided by an external component such as a database, or may also be implemented as an application on the run-time system.

Figure 14:
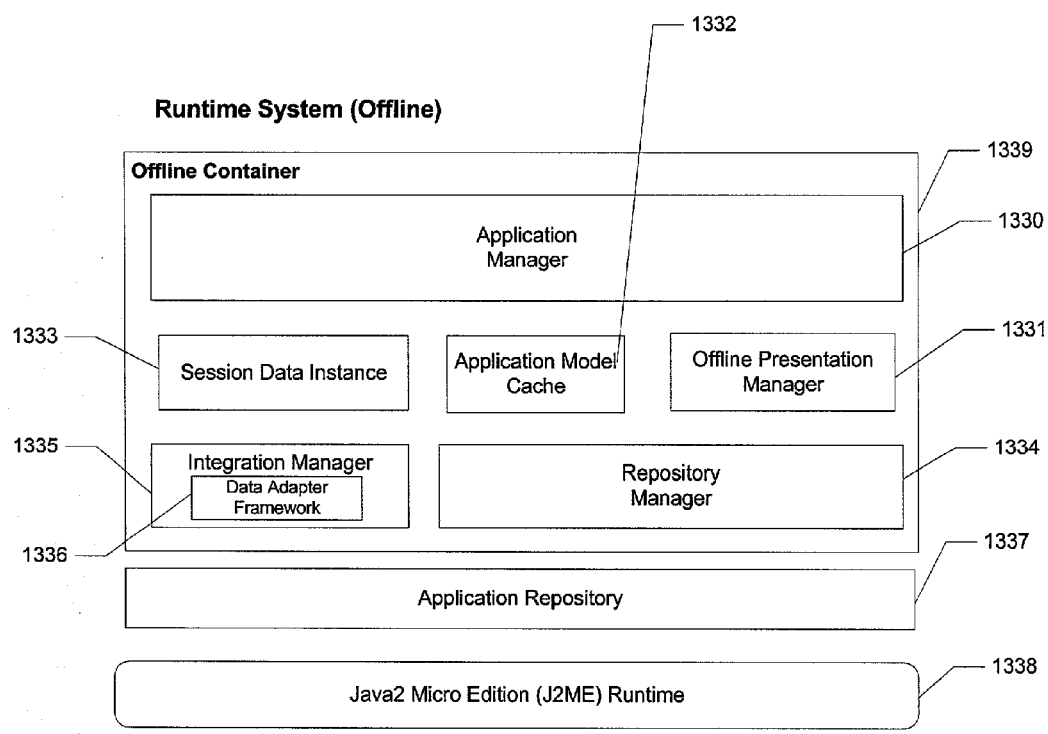
FIG. 14 is a schematic block diagram of a preferred offline embodiment of the run-time system of the current invention.

FIG. 14 illustrates the components of the preferred embodiment of an offline system. The blocks in FIG. 14 are numbered similar to the blocks in FIG. 10 with like elements having reference numerals incremented by 100. The offline embodiment is similar to the online embodiment except for the container 1339, presentation manager 1331, session data 1333 and the environment 1338. The container, which provides session management capabilities, is not required in an offline embodiment since at any given time only a single session is possible. Due to the knowledge of the particular device the offline system will run on, the need to carry the whole multi-channel support functionality provided by the presentation manager is unnecessary. Thus 1331 is a scaled down version of the presentation manager with support just for the device it needs to run on. Session data 1333 for the offline system uses a static storage for data persistence instead of using the container to store data in a session created by the environment. Instead of the full-fledged environment that the preferred online embodiment runs on, the offline embodiment needs only a Java 2 Micro Editor (J2ME) compliant environment. Besides the differing blocks described above online and offline embodiments have the following additional differences:

1) In the offline system there is only one user per running instance of the application manager.
2) Offline system does not require the use of a secure channel since the communication between the device and the application manager is via an inter-process communication channel and cannot be intercepted.
3) Offline system does not use the multi-channel rendering from presentation manager since there can be only one channel that user can interact with the application in.
4) Preferably, applications executing on the offline embodiment may need to support data synchronization as depicted by 1327 in FIG. 13.

These differences allow a simplified implementation of an offline embodiment. Since only a single session is possible on the device, full-fledged support for session persistence is not needed; it is enough to have a single session-data object to support all incoming requests.

Figure 15:
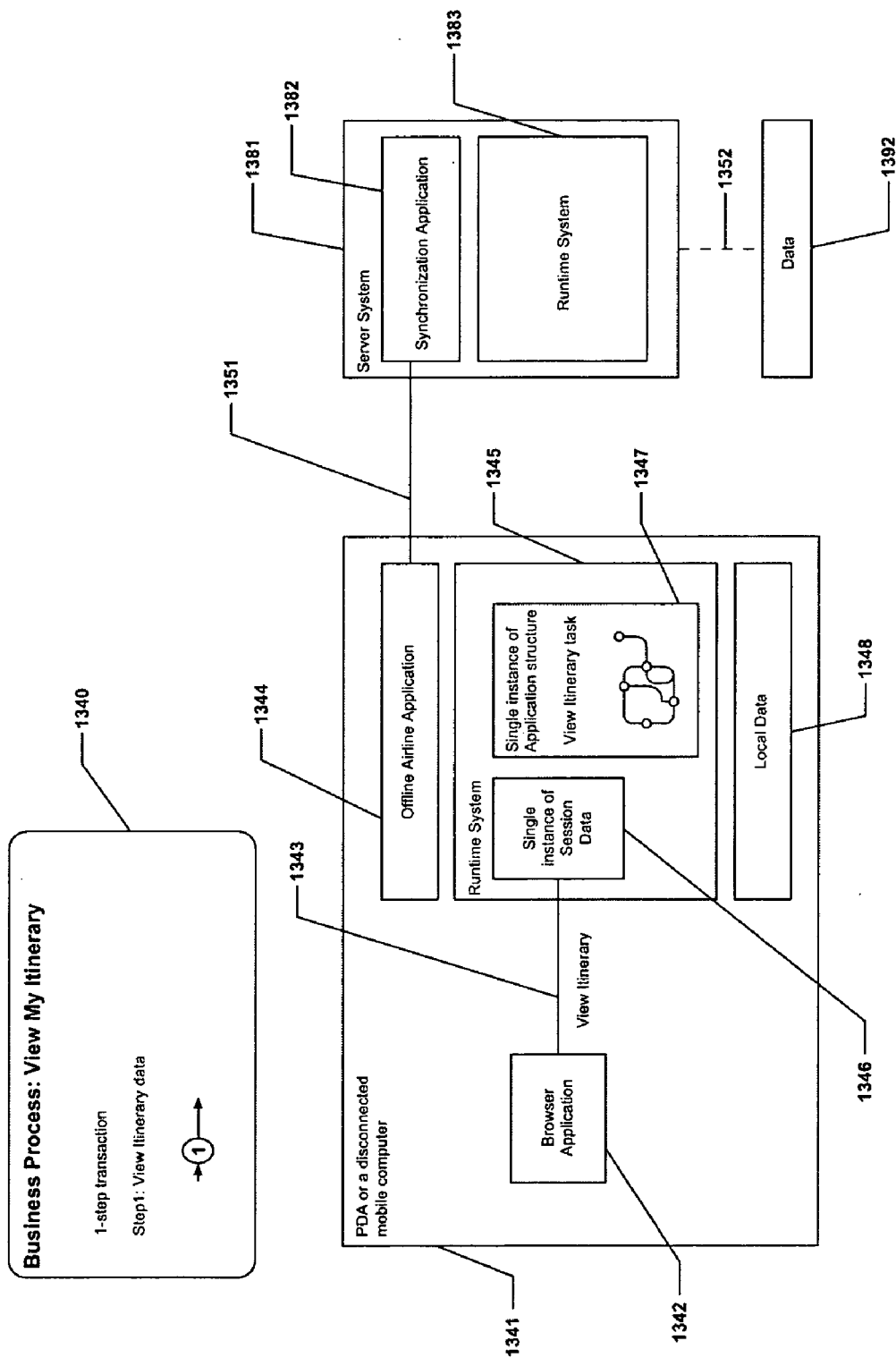
FIG. 15 is an exemplary offline airline reservation application that uses the preferred offline embodiment of the current invention.

To further elucidate the preferred offline embodiment specified thus far, another exemplary airline reservation application is described in FIG. 15. This application 1344 is executed by the offline embodiment of the run-time system 1345, which is resident on a mobile computer system 1341. The same mobile computer system 1341 also has a standard external browser application 1342 that users use to interact with the application 1344, and then perform tasks (also referred to as business processes). For simplicity, the application allows a single task: Users are able to retrieve their itinerary and view it. This is a single step transaction as illustrated by 1340. Preferably, in this application, at any time, there is only a single user (say the owner of the device) who is using the application at any time. The snapshot described by the FIG. 15 shows the offline embodiment of the run-time system 1345 maintaining a single instance of user session-data 1346 and a single instance of the application structure 1347. The itinerary information required in task 1340, is locally available in Local data 1348. Hence, without any external network access, the browser is able to communicate with the locally resident application and perform the task of viewing itinerary information. Line 1343 represents local communication using standard inter-process communication methods, inside the mobile computer system 1341.

It is also possible to periodically synchronize the local data 1348 with a server system 1381. The synchronization communication 1351 is performed over a network with a server system 1381. In this example, the server system also runs a synchronization application 1382 on a preferred online embodiment of the run-time system 1383. The server side application has access to data 1392 over a network 1352. Thus, we demonstrate the use of the preferred offline embodiment resident on a mobile computing device, where users have access to local data without requiring wireless or wire-line network connectivity. Further, it can communicate with a remote server computer system to synchronize and update its data.

Figure 16:
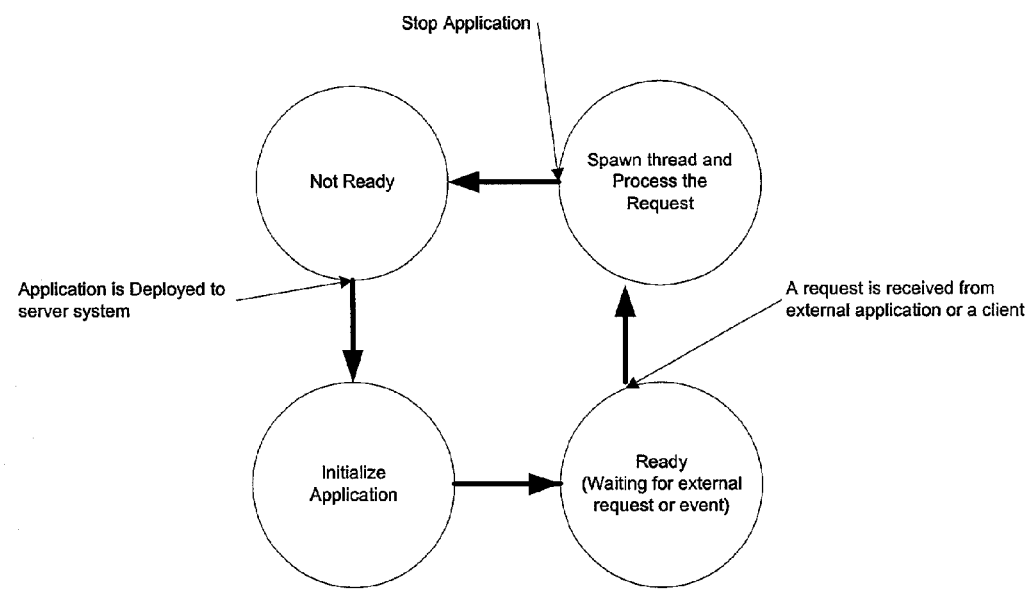
FIG. 16 is a diagram illustrating all the operating states in which a preferred embodiment of the present invention can operate in all embodiments.

FIG. 16 elucidates the operation of the run-time system 92. When there is no application deployed on the run-time system, it is in a "Not Ready" state. When an application model is deployed on to the system, the system accepts the application model, and proceeds to "Initialize Application". The process of initialization is described by FIG. 17, and explained in detail below. After initialization is complete, the run-time system 92 is now "ready" to accept external client requests. Many clients may be engaged with the system simultaneously, and the system is capable of handling concurrent requests. Each time a request is received, the system "processes" the request and sends an appropriate response to the client.

Thus there are two phases for each application execution—the initialization phase, where the run-time system 92 starts up the application, and the request processing phase, where the run-time system 92 services client requests.

Figure 17:
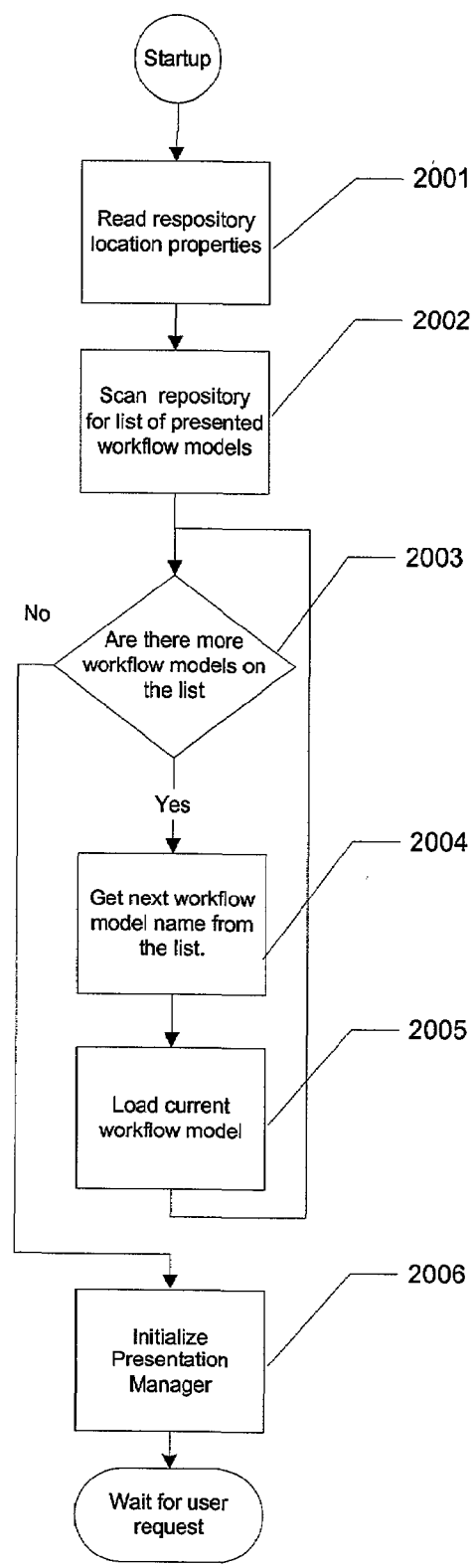
FIG. 17 is a flow diagram of the process of initialization of an application of the run-time system of the current invention initializing before it is ready to accept connections.

FIG. 17 exemplifies the initialization phase. In a preferred environment, the run-time system 92 does not initially have an application model loaded. When an application model is deployed to the run-time system 92, a process of application model initialization is started by the repository manager component. Once the repository manager is started it reads the configuration file that defines property values (Step 2001). These property values specify where the application should be loaded. The preferred embodiment has a configuration file in the form of a Java property file where each record occupies one line and consists of a name-value pair.

Once the repository manager acquires a reference to the application location, it loads the definition of the application as a table. The table contains the list of workflow models and type of loader object that has to be used to load the definition of that Workflow Model (Step 2002).

Then the repository manager walks over that list (Steps 2003–2005) and for each item on the list instantiates a corresponding Workflow Model Loader and loads the corresponding Workflow Model. The loaded Workflow Model object is stored in a table where each model name is mapped to the corresponding Workflow Model object. The repository manager then initializes the presentation manager component, which in turn initializes the device detection sub-system. The device detection sub-system loads an XML document called the device tree (described in detail in FIG. 23 further below) that specifies the device detection logic that the system needs in order to detect client device types.

Figure 18:
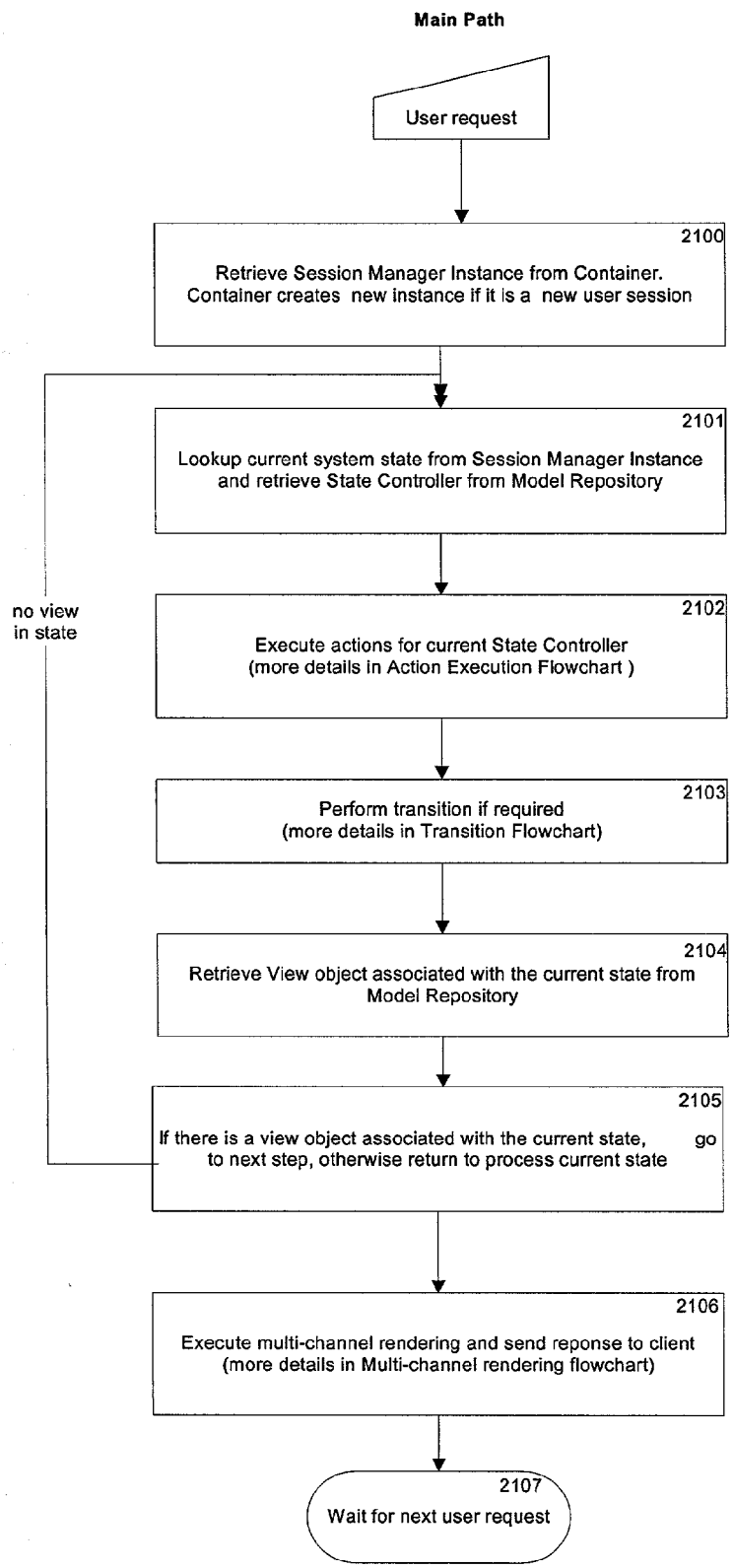
FIG. 18 is a flow diagram of a client request being processed by the run-time system of the current invention. This main flow diagram calls other execution flows illustrated below by FIGS. 19–24.

A method of defining application models and persisting them is described in Assignee's patent application Ser. No. 10/054,623, entitled SYSTEM AND METHOD FOR BUILDING MULTI-MODAL AND MULTI-CHANNEL APPLICATIONS. The flexibility of the architecture provides many ways the Workflow Model Loader can be implemented. Alternatively, Workflow Model Loaders may be implemented using the Java programming language. A loader thus implemented may build the structure of state-controller, action and state-view objects and define the relationship between them. FIGS. 18, 19, 20, 21, 22, 24 exemplify the request processing phase and the complete life cycle of a request. FIG. 18 elucidates a method for handling a user request using the definition of a current state in interaction workflow. Request processing begins when the application manager receives a user request. In order to have access to data persisted in a session associated with the user request the application manager makes a request to the Container (Step 2100). The container implementation is specific to operational environment: for example in an online embodiment the run-time system uses J2EE Servlet API session support mechanism to locate an instance of the session-data. If it fails to locate a session, then a new instance of operational environment specific session-data is created and initialized with the first state of the application. The newly created, or successfully located instance of session-data is used subsequently to process the request.

In order to identify the state of the current request, the application manager queries the session-data. The state identification object thus acquired from session-data is the current state.

The application manager looks up the current state-controller object from the model repository using the current state as the key (Step 2101). Once application manager gets the state-controller for the current state, it makes a request to the state-controller to execute its logic (Step 2102).

Those skilled in the art will appreciate the fact that there are many ways a state-controller can be implemented and/or defined. For example, in the preferred embodiment state-controller logic is implemented using a list of action objects. Each action is a reusable logic element that may perform operations on session-data. The Action mechanism is based on the Object Oriented concept of polymorphism. All Action objects have to implement an interface Action, which has a method 'exec' with parameter of type session-data. The state-controller uses the polymorphism mechanism to call the overloaded method of a particular Action object.

With reference to FIG. 18, the state-controller executes the logic of the state, which may result in a transition to another state or another workflow model (Step 2103). Details of this operation are explained in FIG. 19. Once the application manager is done executing the state logic, it tries to retrieve the presentation definition object for the current state further referred to as the state-view (Step 2104). Executing state logic may also involve taking a transition and executing the corresponding event handling logic, if required. If there is no state-view defined for the current state, then the application manager restarts execution of logic for the current state from operation 2101. The application manager continues this process until it reaches a state that has a corresponding state-view object defined.

Once the application manager reaches a state with a state-view, it interacts with the presentation manager to execute the multi-channel rendering (Step 2106). Subsequently, the response from the presentation manager is sent back to the client device. The application manager then waits for the next user request (Step 2107).

Figure 19:
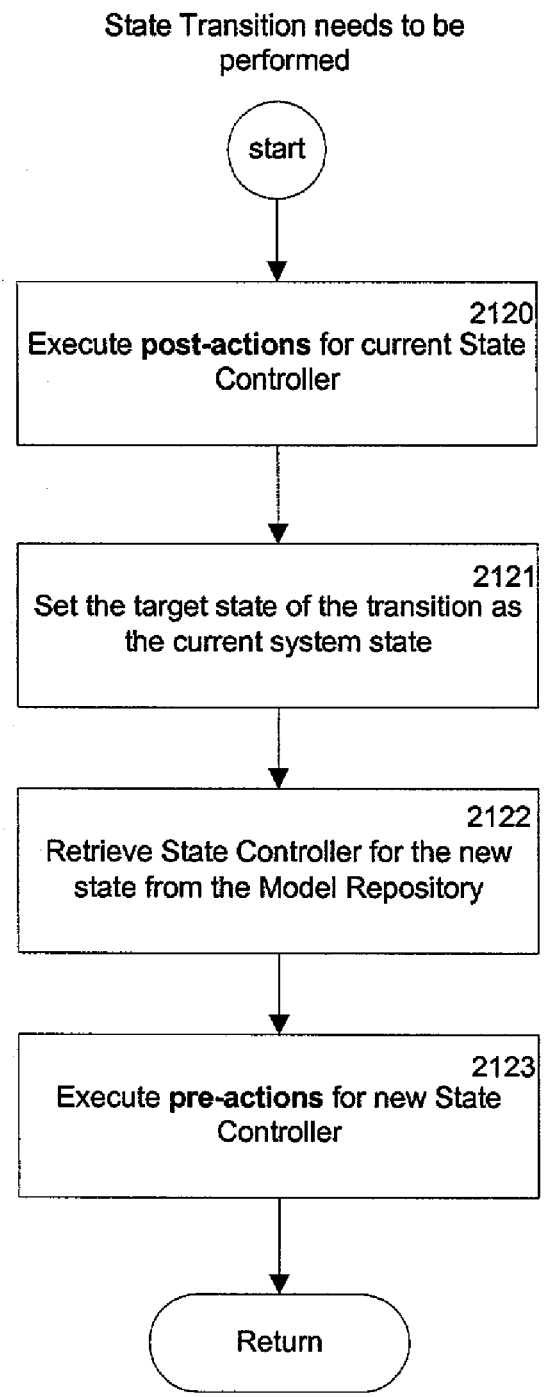
FIG. 19 is a flow diagram of a transition request being performed by the Application Manager component of the current invention.

FIG. 19 exemplifies execution of a transition. Before actually changing the current state to the new target state, the application manager requests the current state-controller to execute the behavior defined to be executed after a transition from this state occurs. (Step 2120). During the execution of Step 2120, there cannot be new transition requests, as there is a transition already in progress. After a transition is accomplished, the application manager makes the new 'target' state as the current state (Step 2121). The application manager then retrieves the new state-controller from the model repository and makes a request to it to execute the behavior defined to be executed when a transition to a new state occurs (Step 2122). Processing this logic for an embodiment is illustrated in FIG. 20 using a set of pre-actions, actions, and post-actions (Step 2123).

Figure 20:
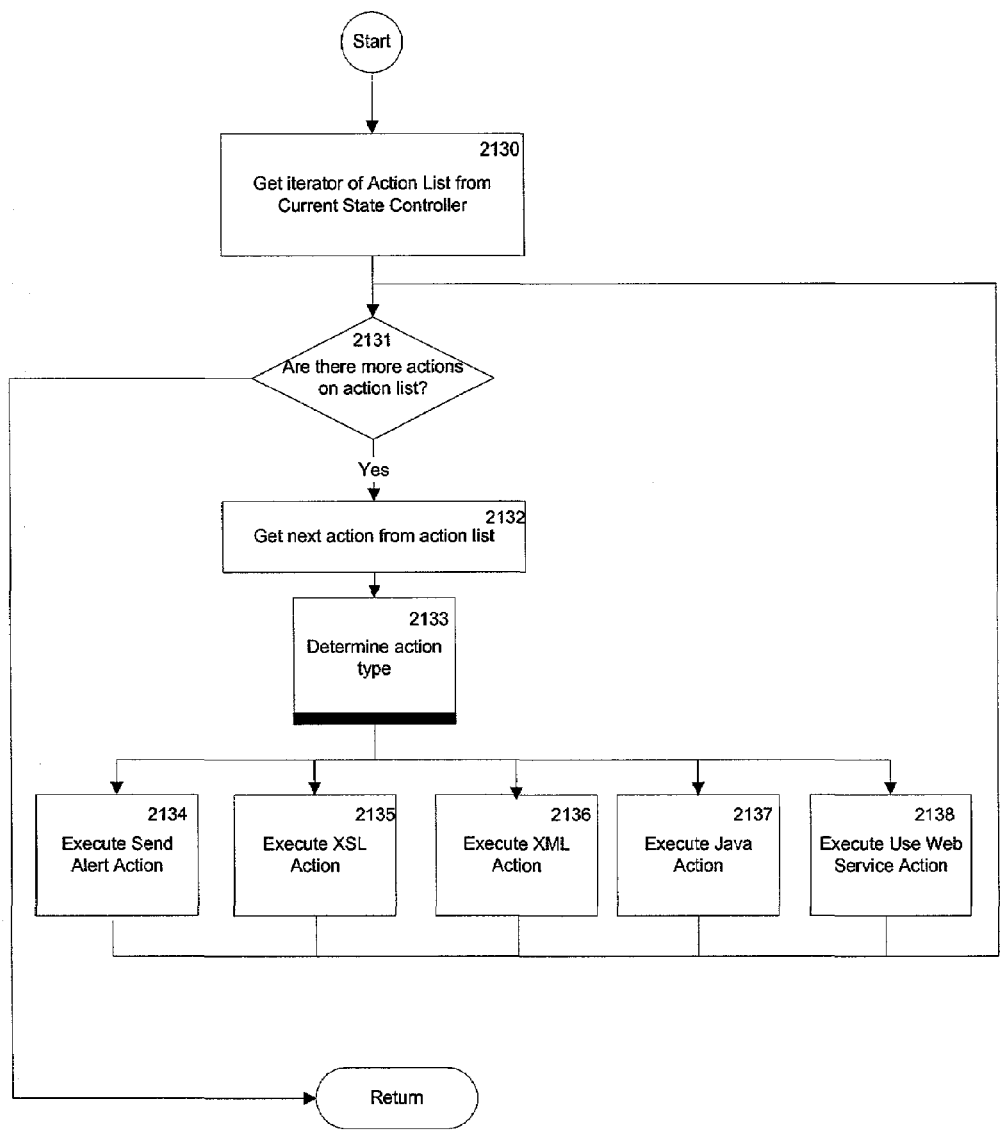
FIG. 20 is a flow diagram of the Action execution being performed by the Application Manager component of the current invention.

FIG. 20 illustrates the execution of state-controller logic as implemented using a list of action objects. In this case whenever the state-controller gets a request for execution, it requests for iteration over the list of actions (Step 2130) referred to further as the action list iterator associated with the current state. While action list iterator has more items available (Step 2131), the state-controller fetches the next action from action list iterator (Step 2132) and executes it (Steps 2133–2138). Thus an action plays the role of logic component that can run some reusable part of logic. For example, the preferred embodiment contains the following set of predefined actions:

1. Send alert action (2134)—can be used for interactions with an alerts system to send out SMS and email messages.
2. XSL action (2135)—can be used for building XML documents from Java objects.
3. XML action (2136)—can be used to extract data from XML documents and pass it onto a user object.
4. Java action (2137)—can be used to define logic using Java code.
5. Web-service action (2138)—can be used to execute operations on external Web-services.

Figure 21:
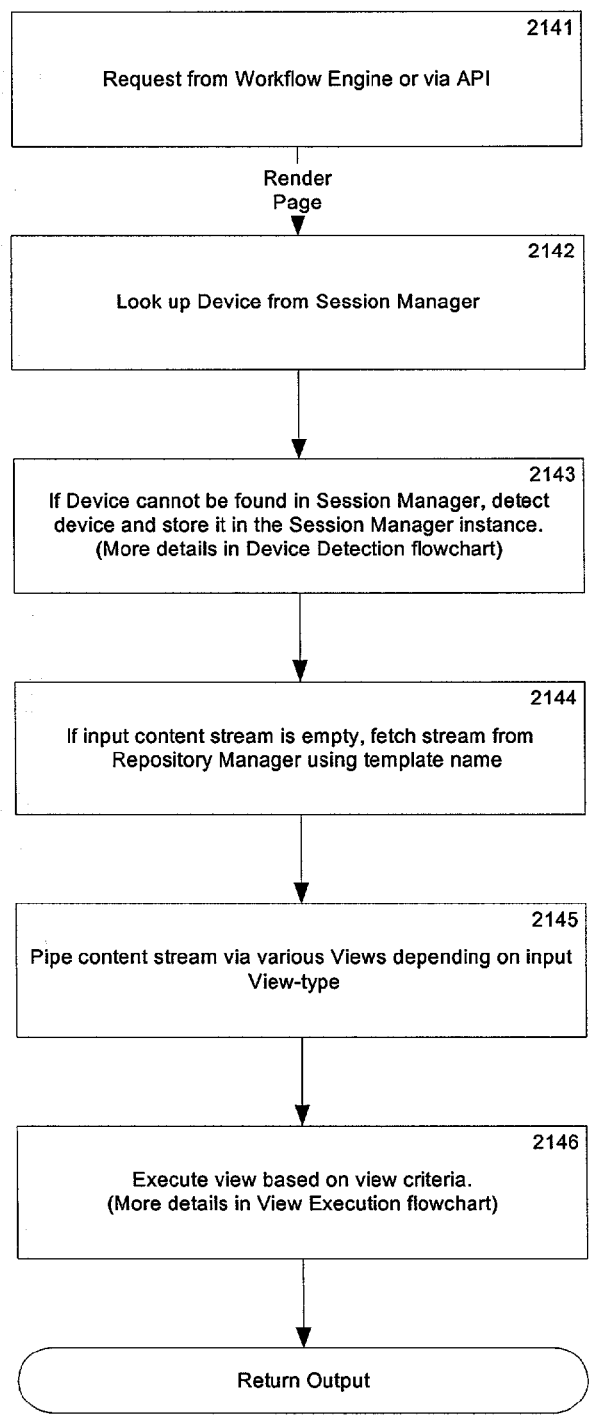
FIG. 21 is a flow diagram of the Multi-channel rendering performed by the Presentation Manager component of the current invention.

FIG. 21 illustrates the operation of the presentation manager when a request is made to render multi-channel output either by the application manager or via a program using the Application Programming Interface (API) exposed by the presentation manager (Step 2141). Step 2142 checks if a device detected in a previous connection from the same device is available from the session-data instance. In the absence of which, a call is made to the device detection sub-system to detect the device (Step 2143). The device detection sub-system uses request information to identify the device. The device thus detected is stored in the session-data for use by subsequent requests. The presentation manager then fetches input content stream from the repository manager if it is not directly passed to it (Step 2144). The output manager 1702 uses the input view type to direct the output of the current view through other views (Step 2145–2146).

Figure 22:
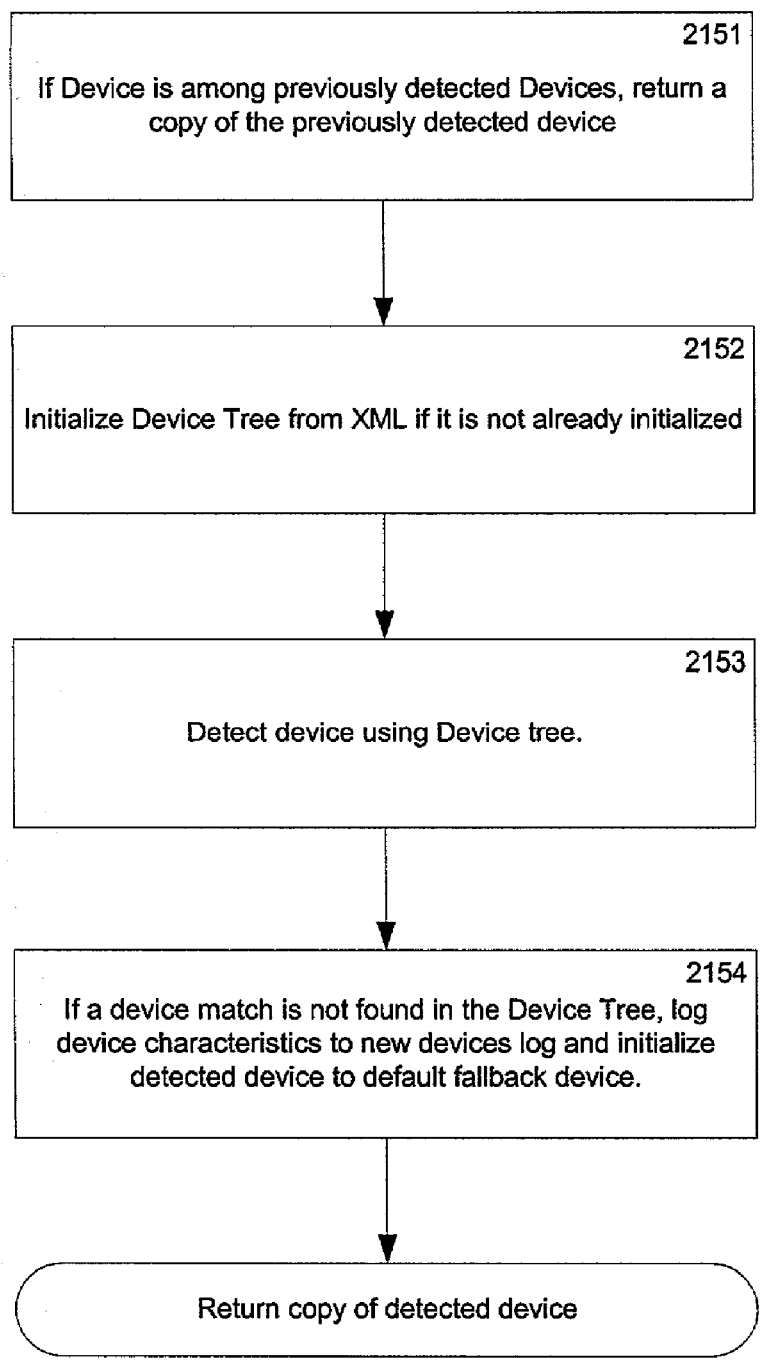
FIG. 22 is a flow diagram of the Device Detection Sub-system of the presentation manager component of current invention.

FIG. 22 elucidates the device detection sub-system. The system keeps a cache of the device types previously detected in this run of the run-time system 92. If the device connecting is in the cache, then a copy of it is returned by the device detection sub-system (Step 2151). If the device is not detected from the cache, the device detection sub-system proceeds with detecting the device using the Device Tree (Step 2153), which is a tree structure consisting of device type classes and device types as nodes. If a matching device is not found, the device is initialized to a default fallback device (Step 2154).

In the preferred embodiment, the device tree is stored in an XML format, which will be referred to as Device Tree Language (DTL). It is initialized once per run of the run-time system to optimize performance. The following table outlines some non-limiting examples of tags in DTL, with a description of the tags' functions and their legal "child tags." XML is a convenient way to represent a hierarchy of "nodes" where a "node" is a tag, the tag's attributes, and the tag's data. Essentially, XML will describe a tree of nodes. In this tree, there will be nodes (tags) that will have parent-child relationships. So, a child tag will be contained within a parent tag. (Note: (None) means the tag has no valid children; a tag name followed by '+' means there must be one or more instances of this child tag; a tag name followed by '*' means there must be zero or more instances of this child tag; and a tag name followed by '?' means there can be zero or one instances of this child tag. In addition, two or more tags separated by '|' means that either tag may appear as a child.)

| Tag | Description | Children |
|---|---|---|
| DeviceLibrary | Top-level element for DeviceLibrary XML; Everything contained in the document is a child of this element | Condition, Device* |
| Device | Represents a device or a class of devices together referred to as a device. A device consists of the Condition under which this connection will be identified as originating from this device and a list of zero or more child devices.<br>category - a name given to the device or class of devices<br>directory - the directory (in path) in which XSL rules for this device can be found | Condition+, Device* |
| Condition | One or more expressions which when matched with request information from the connecting device satisfy this condition. | Expr+ |
| Expr | An expression consists of one or more patterns to match against request information and zero or more expressions. An expression as a child of another expression represents an inclusive condition, i.e. both expressions should match for the condition to be satisfied. Whereas an expression as a sibling of another expression represents an exclusive | Pattern+, Expr* |

-continued

| Tag | Description | Children |
|---|---|---|
| | condition, i.e. a match with one of the expressions is enough for the condition to be satisfied. | |
| Pattern | A pattern is a string (expr) to match with against request information, a Boolean indicating whether the match should be made as a sub-string and a Boolean indicating whether the comparison should be case-sensitive. Patterns follow the same rules as Exprs for child, sibling relationships. | Pattern* |

FIG. 23 is a sample device tree defined in XML conforming to the Device Tree Language. One skilled in deciphering XML documents will recognize that FIG. 23 describes a tree of devices that support xHTML, HTML or cHTML. Further the document specifies that this tree contains two (2) sub-categories viz., cHTML devices and HTML devices. The HTML devices sub-category in turn consists of WinCE device and Palm device categories. One skilled in the art will appreciate that the format described herein is extensible. New devices or device categories (also referred to as device classes) may be added by simply extending this document to include additional devices.

Referring again to FIG. 22, step 2153 employs a point system wherein a single point is awarded for every pattern matched between each node in the device tree and the connecting device. The tree node that fetches the highest points is chosen as the device type or device type class. In the event of none of the nodes fetching any points, the device type is initialized to a default fallback device (Step 2152).

Figure 24:
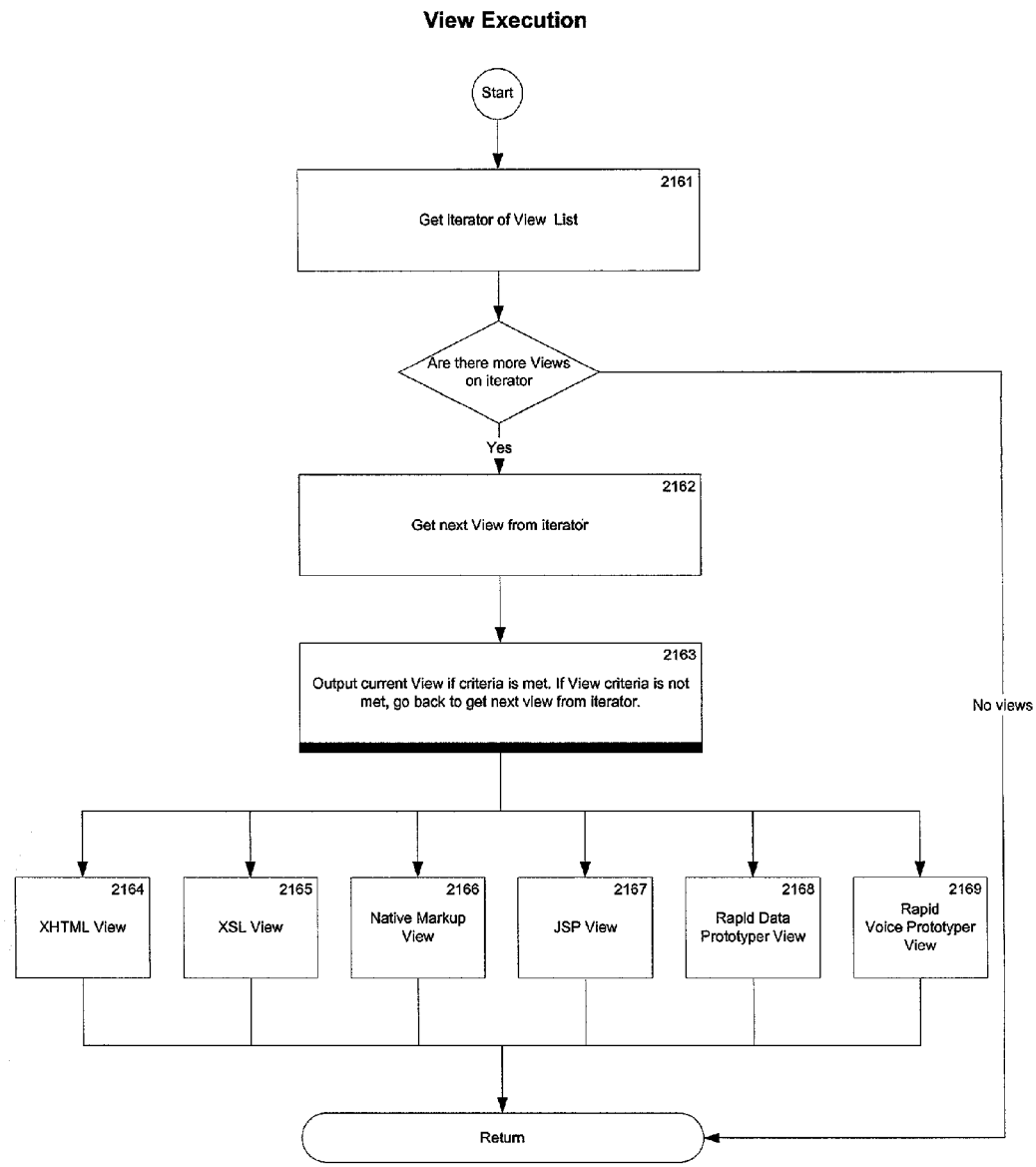
FIG. 24 is a flow diagram of the View execution as performed by the Presentation Manager component of the current invention.

FIG. 24 illustrates View executor 1701 and the pre-defined views defined by presentation manager. Each one of these views 2164–2169 accepts input content (presentation templates) either as an input stream or as a file name (template) using which the view can request the content from the repository manager. Each state of an application can define a list of Views that can be used to render content for that application state (It is explained in more detail in Applicants' co-pending patent application). The view executor 1701 iterates through this list of views (Step 2161) until it finds a view with satisfying view criteria for this request. Once a view is found, the view executor executes the view and sends the response back to the requesting client device (Steps 2162–2163). Sending the user response marks the end of processing for this request.

The processing of a single client request has been described. Preferably, this is the main method of interaction between clients and the application executing on the run-time system. Most business processes require users to send multiple successive requests in one session in order to complete a task. Also, in a typical environment, several client terminals will be simultaneously engaged in active sessions with the server system. Typically, the container is responsible for session management and re-association of sessions with users. In the forthcoming explanation, successive steps that complete a task will be referred to as a transaction.

While executing state-based applications that are transactional by nature, additional functionality is required by the run-time system 92 to handle server side state and session management. The system supports at least the following capabilities: (1) Multi-channel state based session management; (2) Handling out-of-sequence client requests in a session; and (3) Handling context switching between secure/authorized and non-secure states in a session.

Multi-channel state based session management is a method and apparatus to support reconnections for joining partially completed transactions. These may be transactions interrupted either by design or accidentally when a call is disconnected.

The preferred embodiment of the run-time system 92 should seamlessly handle transaction reconnects if the application is designed to use that feature. When a transaction is started the run-time system 92 uses the underlying container to create a session associated with an identifier. The identifier can be associated with user credentials (i.e., name-password). As the transaction progresses through various states, all information regarding the transaction, the work-flow path and the content are logged to the session. These sessions are kept in memory for a specific period of time. When the transaction is completed normally though an exit state, all session information is logged to a database so that whole transaction's trail can be re-constructed if required.

If a transaction is dropped in-between due to network problems, then the session remains active for a specified amount of time. During the time that a session is still active, if the user re-connects to the system, the authentication module will re-construct the transaction from the session. The user is then offered a way to re-join the previously dropped connection at the state the connection was dropped to finish the transaction.

The run-time system, via the underlying container, also employs one session per transaction per user. This ensures that the same user from two different devices or media does not manipulate any single transaction at the same state concurrently. It is important to remember the word same in the previous sentence because the user has the ability to re-join a transaction from a different medium if the connection is dropped in one of the states.

One of ordinary skill would appreciate the aspects of design that need to be kept in mind while creating applications that require multi-channel state based session management. Typically, the application must be process centric (i.e., all aspects of the application flow logic can be represented using a finite state automaton). Each transaction of the application begins at a designated start state of the application and can exit though any of the application states. A transaction is deemed complete if the application begins at the start state and finishes at one of the end states. Some of the states of the application can be marked as commit states, from which the application can re-cover the transaction without having to restart at the begin state. All states that are not begin and end states are intermediate states.

Figure 25:
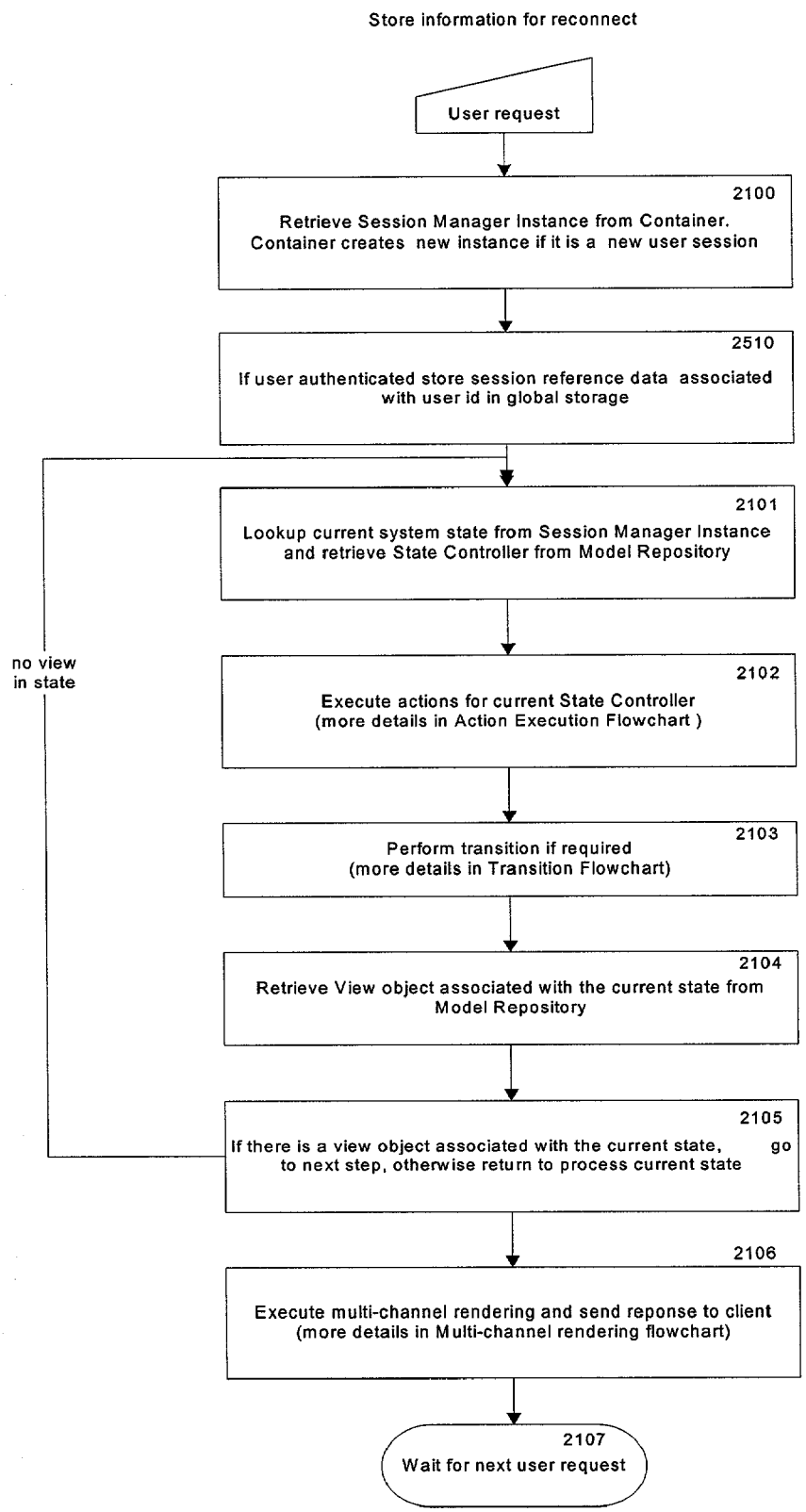
FIG. 25 is a flow diagram that describes the processing of multi-channel state based session management and handling of dropped sessions.
Figure 26:
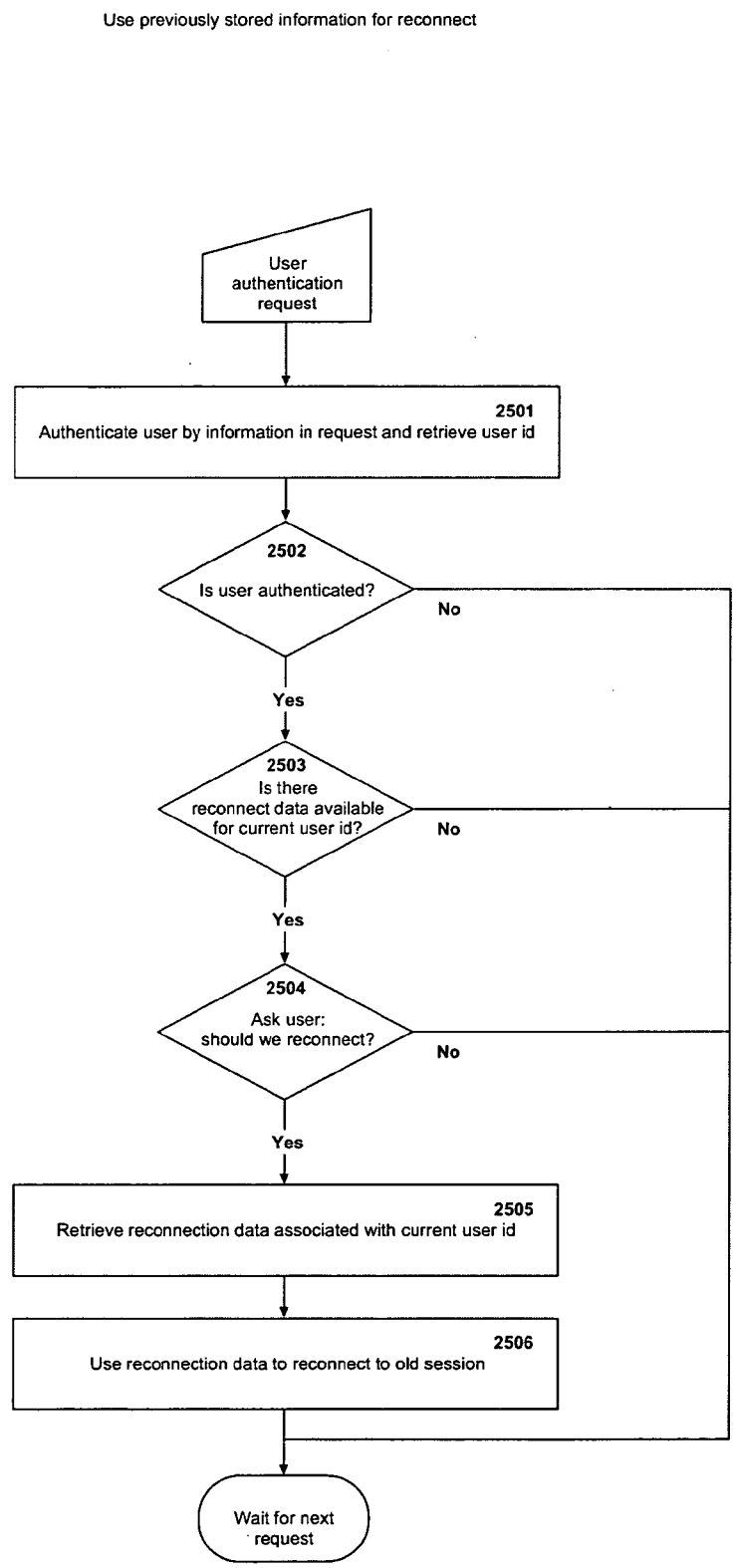
FIG. 26 is a flow diagram that describes the retrieval of reconnect information.

FIGS. 25–26 illustrate the process flow that achieves multi-channel state based session management. FIG. 25 illustrates the process of storing state reconnect information in a global storage with every incoming request, and extends the process described in FIG. 18 with an additional step 2510 to check if the user has been identified. Once the user has been identified, the user id is retrieved from the session-data and the session identifier of the current session is stored against the user id in a global store. The rest of the processing steps 2100–2107 are handled as described previously in FIG. 18.

FIG. 26 illustrates how a user is placed back into the state from which the user was disconnected. Step 2501 authenticates a user and assigns a user id. One of ordinary skill in the art will appreciate that step 2501 does not place any restrictions on the mode or channel the user is connecting back in. Step 2502 makes a decision on whether the user authentication was successful or not. Again one of ordinary skill in the art will appreciate that the method adopted to authenticate a user can be independent of this step. In the yes-branch of step 2502, step 2503 checks if reconnect data associated with the authenticated user id is available in the global storage. In the preferred embodiment of the invention, this global storage is implemented as an in memory storage. However, alternate embodiments may be based on other methods of storage including but not limited to databases. In the yes-branch of step 2503, step 2504 queries if the user wants to reconnect. In the yes-branch of step 2504, step 2505 retrieves reconnect data for the current user id and in step 2506, the user is connected back to the prior session state. Subsequent requests from this user would be as if the user never left this transaction. Thus multi-channel state based session management can be used to present a reconnecting user an option to continue from a previous point of execution.

Figure 27:
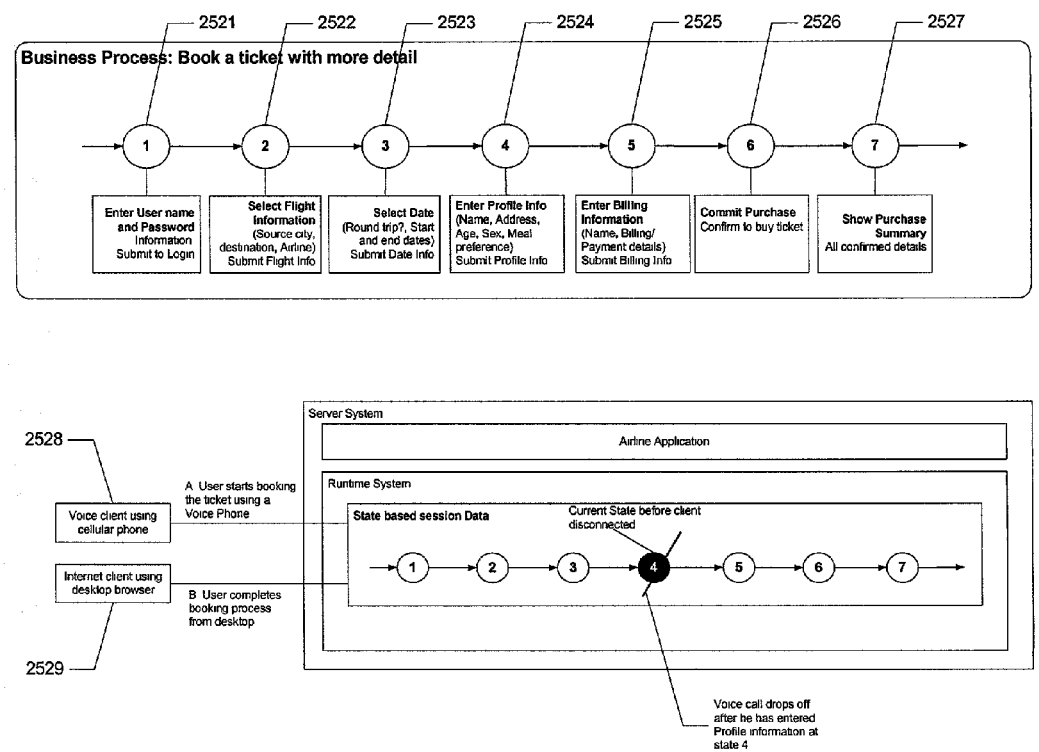
FIG. 27 is an exemplary airline reservation application scenario that illustrates multi-channel state-based session management.

FIG. 27 is an exemplary airline reservation application scenario that elucidates multi-channel state-based session management further. The business process to "book a ticket" is described in detail. The book a ticket process consists of seven steps (Steps 2521–2527) starting with logging into the system 2521 and ending with purchase of a ticket 2527. A user 'xyz' connects using a mobile handset 2528 and starts the process of booking a ticket. But when the user reaches step 2524 in the transaction, the call is dropped due to network unavailability. The user then uses his desktop PC to connect back to the airline reservation application. After going through step 2521 where the user is authenticated, the system identifies that this user has an incomplete transaction and provides a two options—(1) to continue with the previous transaction or (2) to start a new transaction. Upon choosing to continue the previous transaction the user is placed into state 4 (Step 2524), which was the current state when the connection was dropped. The user can then complete a transaction started using the voice channel, by means of a wire line channel. Thus multi-channel state based session management handles incomplete transactions allowing users to complete them using the same or a different channel.

Still another object of transaction management is to handle out-of-sequence client requests in a session. Such requests happen whenever the user performs navigational actions that do not follow workflow path, such as: (1) Using "Back" button, whenever the user uses back button and makes a request from any of previously visited pages; (2) User makes a request after the session has expired on the server; (3) User bookmarks a page and returns to it later using this bookmark; or (4) User rejoins session from another device using reconnection URL that does not include request sequence number.

Figure 28:
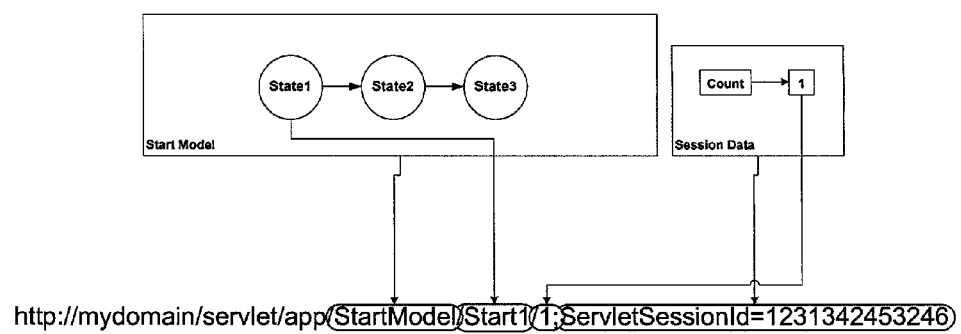
FIG. 28 is a diagram that explains structure of a request URL.

To handle this problem we include additional information in the URL part of request in the following form: [Model Name]/[State Name]/[Request Sequence Number]. FIG. 28 illustrates the structure of one URL; [Model Name] and [State Name] are names of last reentrant state and model that was visited by user while walking through the workflow. The last part [Request Sequence Number] is a sequential number of the request, the session contains a special "counter" variable which maintains this sequence number. For example if URL to access the application is "http://hostname/servlet/app" then after including state information it will be "http://hostname/servlet/app/StartModel/Start/1", which means that the last reentrant state the user visited was state "Start" of Workflow Model "Start Model".

Figure 29:
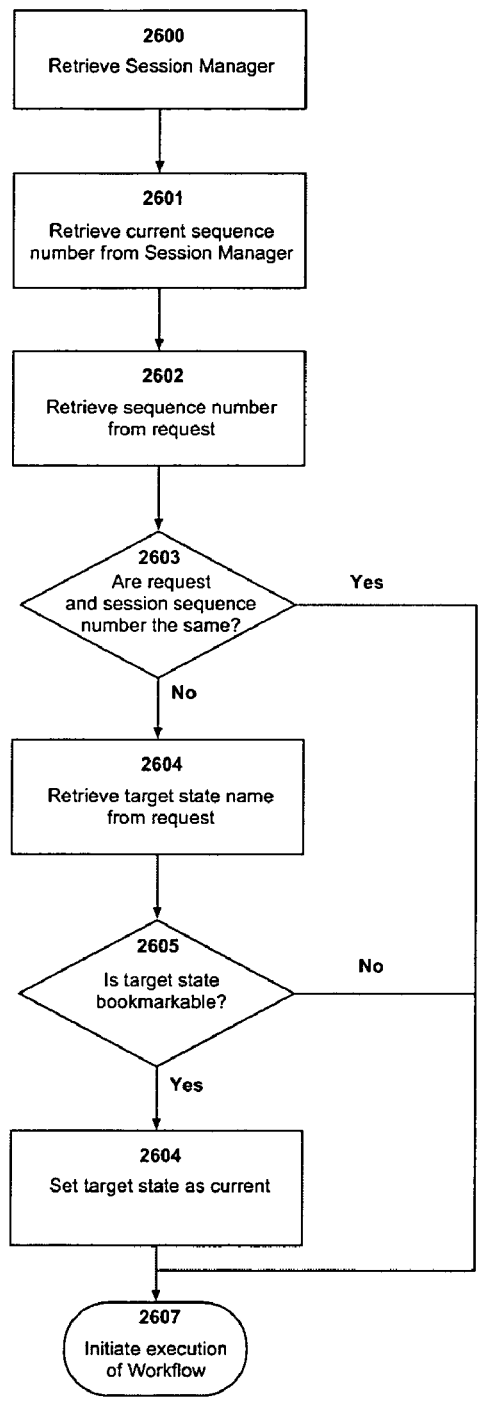
FIG. 29 is a flowchart that describes the processing for handling out-of-context client requests.

FIG. 29 exemplifies the process of handling such URL requests. Steps 2600 through 2602 explain how the sequence number is retrieved from the request as well as the session. Step 2603 checks if those values are identical and makes a decision as to whether this request is in sequence. In the yes-branch of step 2603, the Application Manager proceeds to execute logic for the current state.

Steps 2604–2606 illustrate how a user is placed into a state defined by the URL. Step 2604 retrieves a state-controller for the state defined in the URL. Step 2605 checks if this state is defined as a reentrant; this is defined by Boolean value of property "Is Reentrant" of the state-controller. In the no-branch, the target state is not a reentrant state and thus the "bookmark" is ignored and the application manager proceeds to execute logic for the current state. Otherwise, the application manager updates session-data with the new current state, step 2606, and proceeds with execution of logic for new current state (Step 2607).

Figure 30:
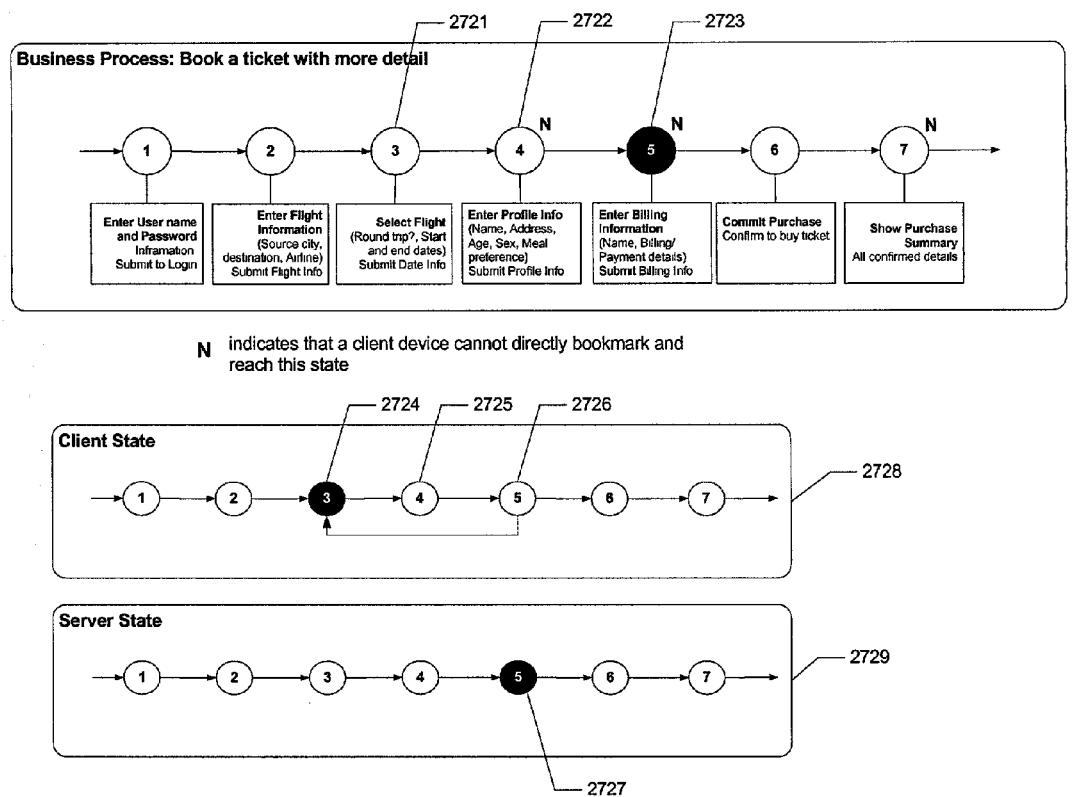
FIG. 30 is an exemplary airline reservation application scenario that illustrates handling out-of-context requests.

FIG. 30 illustrates the above concept further using the exemplary airline reservation system. Here, the book a ticket business process is looked at from the perspective of an out-of-context request. Block 2728 depicts user flow on a client and block 2729 portrays user flow on the server. States 2722 and 2723 cannot be bookmarked since a flight needs to be selected before profile and billing information can be processed. Let's say a user is in the process of booking a ticket and is at state 2723 and decides to change the selected flight. Using the back button of a browser, the user navigates to state 2724 on the client. The run-time system is still in state 2727. Now, the user selects a different flight and submits it to the server. The server determines that it is an out-of-context request and places the user in state 2722. Note that this out-of-context request was serviced because state 2721 is a bookmarkable state.

Yet another object of transaction management is to support transitions between secure and non-secure states. Whenever the user performs data security sensitive interaction with application manager it may be required to enforce that the interaction be secure and/or authorized. A secure interaction is an interaction between the user and run-time system performed through encrypted channels such as HTTPS. An authorized request is a request associated with a session that is marked as authorized, which means that the session contains a Boolean object named 'user is authorized' and its value is true.

Figure 31:
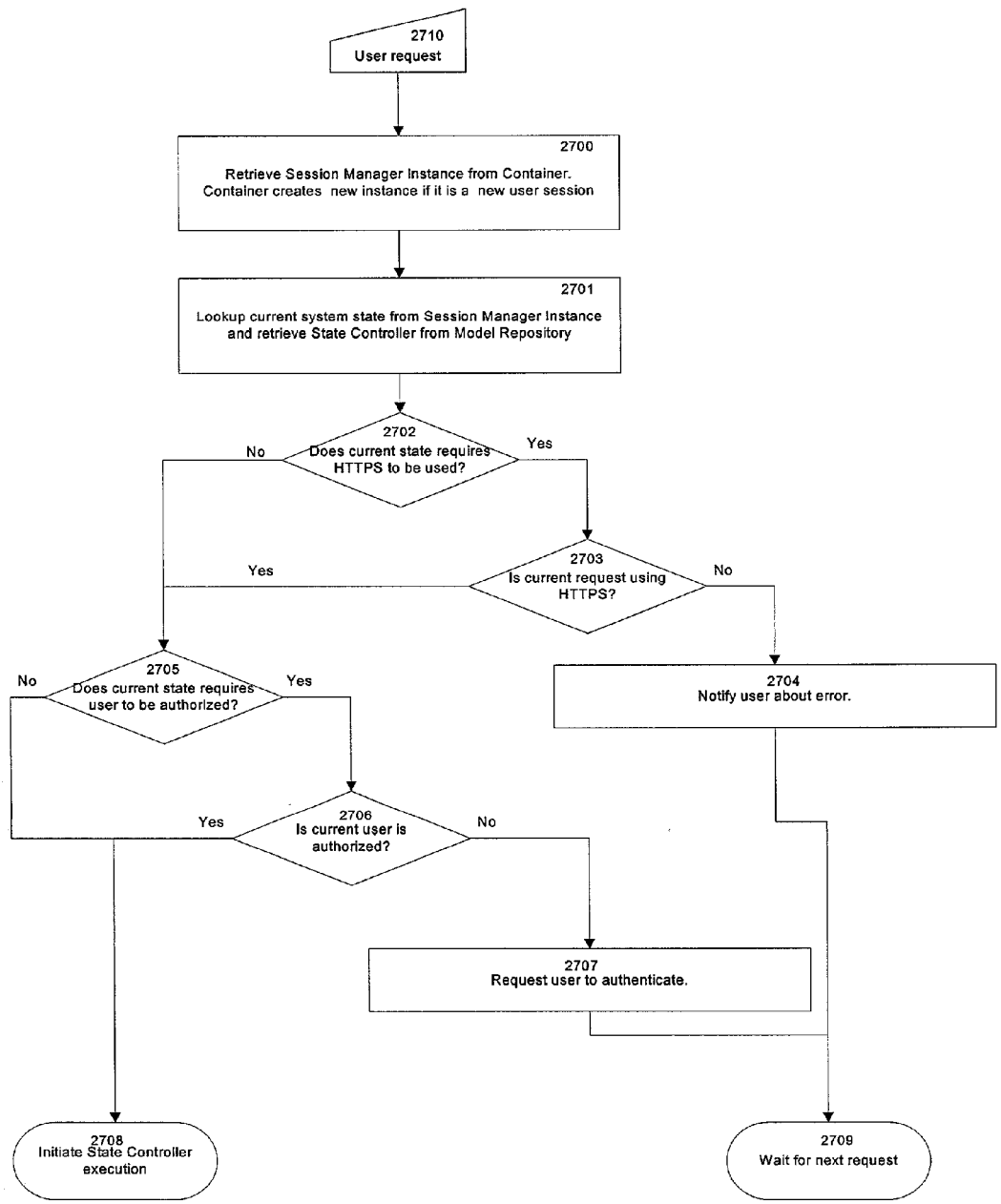
FIG. 31 is a flowchart that describes the processing for security and authorization.

FIG. 31 explains details of request processing involved in the handling of this task see Steps 2700–2710). To identify whether the current state requires interaction to be secure the application manager gets the state-controller and checks the value of its Boolean property "is Secure". The way this property can be set depends on the implementation of the state-controller. One implementation of the state-controller using Java code can initialize this property in the class. When the value of the property "is Secure" is true, the application manger checks if the current request is made using a secure connection and if the connection is not secure then application manager interrupts any further processing and notifies the user that this interaction cannot be performed over a non-secure channel.

To determine whether the current state requires an incoming request to be authorized, the application manager checks value of state-controller Boolean property "is Authorized". One implementation of the state-controller using Java code can initialize this property in the class. When the value of the property "is authorized" is true, the application manager makes a request to session-data to determine if the current session has been marked as authorized. And if it is not, application manager calls a sub-model that defines the process of authorization for this particular application. Otherwise, the application manager proceeds further with the execution of state logic and presentation defined by FIG. 17.

Figure 32:
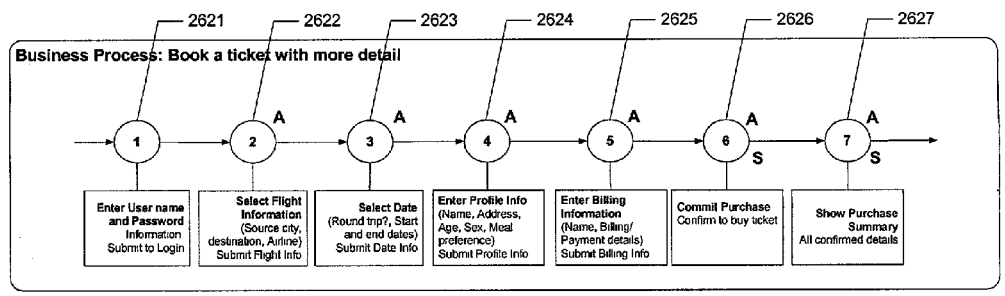
FIG. 32 is an exemplary airline reservation application scenario that illustrates state based handling of security and authorization.

FIG. 32 further elucidates the concept of secure states and states that require authorization using the exemplary airline reservation application, and more particularly, the book a ticket business process of the exemplary airline reservation system. Blocks 2621 through 2627 elucidate the different states in the book a ticket business process from security and authorization perspectives. States 2622 through 2627 require the user to be authorized and states 2626, 2627 require the use of a secure channel, to visit these states. So, when a user tries to select flight information in state 2622 without logging in, the run-time system will throw the user back into 2621. The user will be allowed to visit state 2622 once authorization is successful. Similarly a user cannot visit state 2626 without using a secure channel such as HTTPS. When the user is flowing through the states in a sequence, the run-time system seamlessly shifts into secure mode for states 2626 and 2627.

In addition to request processing and transaction management, it is desirable to support features that allow developers to manage large-scale applications that may contain hundreds of tasks and thousands of steps. We describe two such techniques, and how the run-time system handles these techniques:

Adaptive n-dimensional workflow control henceforth referred to as "Layers" is a method that allows certain portions of the application to be enabled or disabled as deemed necessary. For example, it is possible to logically separate the application into several workflow dimensions. Switching off certain dimensions results in the states in those workflow dimensions to be rendered inactive.

Sub-models or sub-controllers henceforth referred to as "sub-models" provide another method for managing large applications. The concept of a sub-model is much like a sub-routine of a main program. A sub-model allows entire portions of applications to be encapsulated into a sub-model for reuse and simplification of complex applications. A sub-model that is encapsulated for reuse in other applications is also termed as a Component.

A Layer is a set of states and transitions in the Workflow Model. In the preferred embodiment, the set of states and transitions belonging to a particular layer are implemented by assigning the name of the layer as a property to these set of states and transitions. Whenever a layer is disabled the corresponding set of transitions and states are ignored by the run-time system 92. Whenever a layer is enabled the corresponding transitions and states become active and are used by the run-time system 92. A layer can be construed as a logical separation of workflow, which can be based on any condition.

Figure 33:
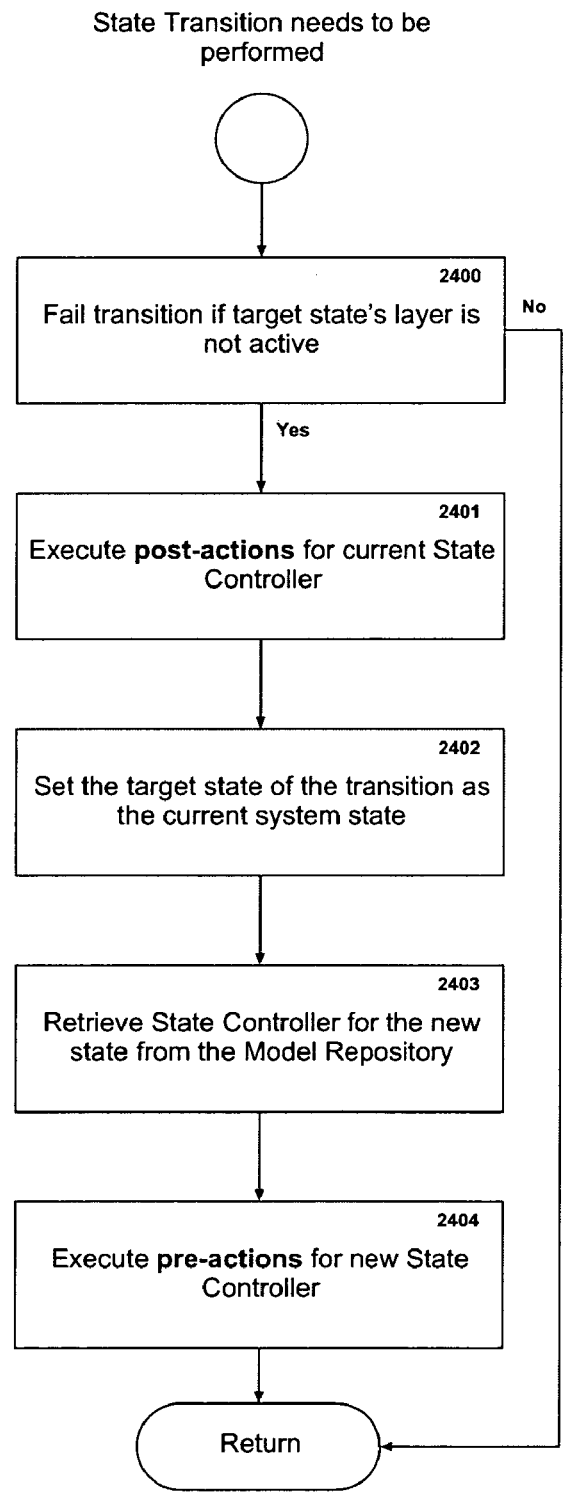
FIG. 33 is a flow diagram that describes the processing of Layers by the run-time system of the current invention.

FIG. 33 illustrates the technique of Layers as implemented in the current embodiment, as a specialized case of the execution of a transition. Each object that represents a transition in the Workflow Model belongs to a particular layer. In step 2400, a transition is accomplished only if the layer to which this transition belongs to is in the list of active layers maintained by the session-data. This makes sure that the application can never be in a state belonging to a disabled workflow layer. Steps 2400 through 2404 continue with rest of the execution of a transition, step 2401 executes post-actions for the current state-controller, step 2402 sets the target state of this transition to the current system state, step 2403 retrieves the state-controller for the new state from the model repository. Step 2404 executes the pre-actions for the new state-controller. Thus, a simple technique like Adaptive n-dimensional workflow control is a method to manage large and complex applications.

In the exemplary example of an airline reservation system illustrated in FIG. 11, the business process book a flight is a four-step transaction. In step 1 "Enter travel details", Client 1 1245 using a desktop computer can enter all the travel details in a single screen since desktop computer normally have enough screen real estate for this. However, client 3 1247 using a WAP phone cannot enter all the travel details in a single screen. For this reason, this step would need additional navigational states to let the user enter travel details using a WAP phone. Preferably, this part of the application maybe implemented using Layers. Using layers the application can branch off into a "WAP Phone" layer to present the user with multiple screens for entering travel details. Thus layers are very useful for implementing multichannel applications where a particular channel needs more navigational states due to screen size constraints.

The workflow sub-model is an extension to the concept of a model. Each sub-model has a single-entry state, and may have one or more exit states. A sub-model has its own set of user objects, which can be internal to the sub-model or exposed externally to the parent model. A method for scoping of variables either as global or as local to the current sub-model is provided. These variables may be used as parameters. When a state for a sub-model is entered, the current context is based on the model defined in the sub-model. All variables of the sub-model are instantiated based on scoping rules defined by the user. After the user flows through a sub-model and exits, the context of the main model is restored.

Figure 34:
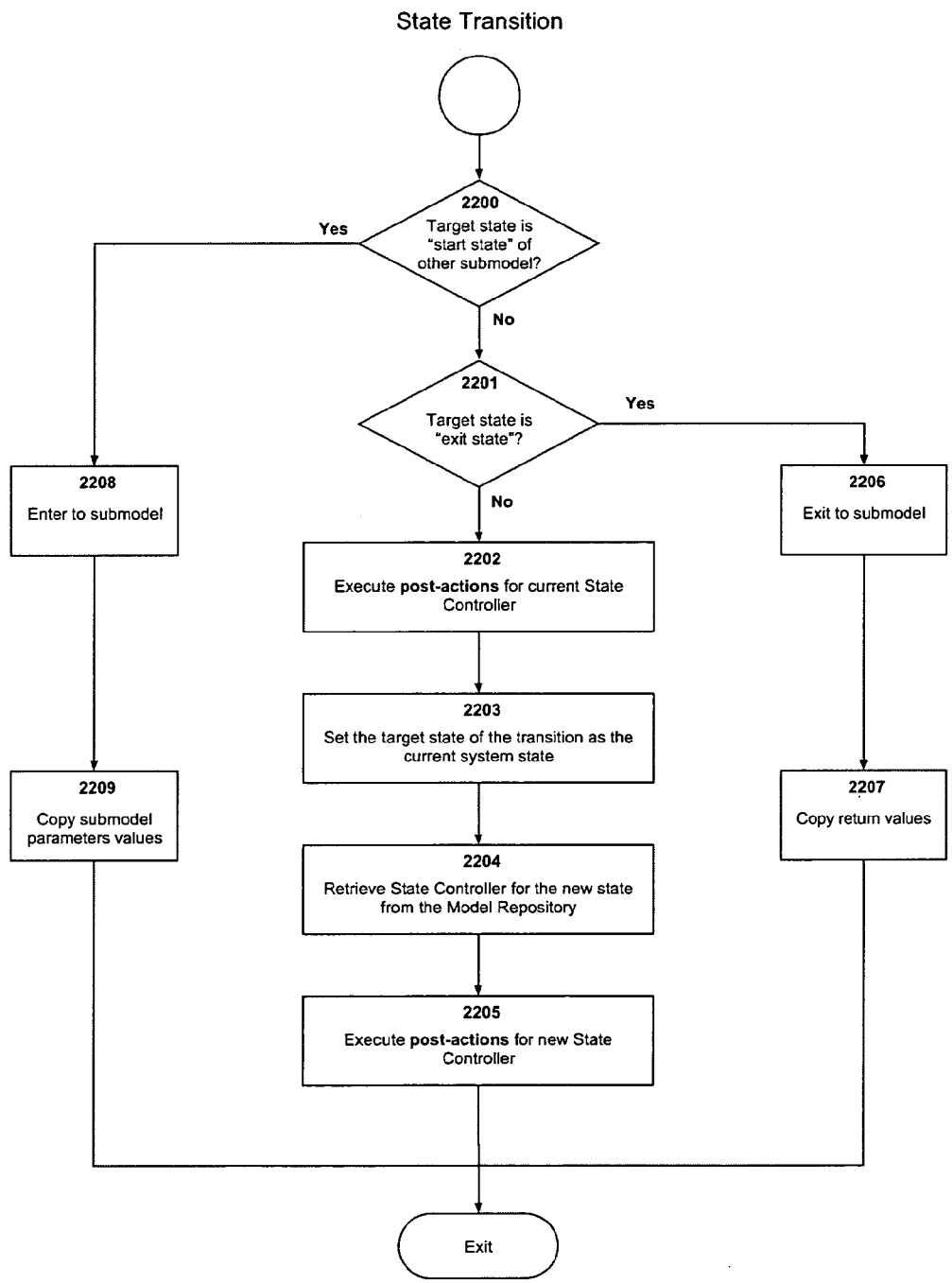
FIG. 34 is a flow diagram that describes the processing of Sub-models by the run-time system of the current invention.

FIG. 34 illustrates the technique of sub-models as implemented in the current embodiment, as a specialized case of the execution of a state-controller. In step 2200, a decision is made after a check to see if target state is a "start state" of a sub-model. The yes-branch leads to step 2208 if target state is a sub-model. The system enters a sub-model in step 2208 by pushing the sub-model scope into stack in the session-data object. Step 2209 initiates the sub-model execution by first copying the parameter values to sub-model variables. The exit from a sub-model follows a similar path where the check for target state being the "exit state" of a sub-model is done in step 2201. The system exits from a sub-model in step 2206 by popping the sub-model scope from stack in the session-data object. Step 2207 completes the exit from sub-model by copying return values from the sub-model to the main model. If the target state is not the exit state in step 2201, steps 2202–2205 are executed.

To further explain the use of sub-models, let's now look at the example airline reservation application illustrated in FIG. 11. The business processes book a ticket 1242, check flight schedule 1243, and view my itinerary 1244 are preferably implemented using sub-models. The same application implemented using a single workflow model may make maintaining the application cumbersome. Moreover, a business process like book a ticket can be re-used in other applications by componentizing it.

The Data-mining module 93, also known as the analysis subsystem or Insight server depends on the run-time system 92 for transaction log data. When a client connects to a run-time system 92, the request is processed by the run-time system 92 and it generates application log files in a specific format. Every operation of the run-time system 92, such as user requests to traverse to a specific part of the application, is logged in the log files. The log files preferably contain the following information: the date and time when the user request originated; the amount of time the run-time system took to respond; the state of the application which was accessed in this request; the subscriber identifier of the device originating the request; the user-agent information of the device originating the request; the unique session identifier generated by the run-time system for this user; the markup language used to send the response back to the user; the error code for this request; the locale of the device originating the request and the set of services used by the run-time system to satisfy this request.

For purposes of analysis, the above raw data is packaged in a specific format. The standard method used for this purpose is Extract-Transform-Load (ETL). In managing databases, extract, transform and load (ETL) refer to three separate functions. First, the extract function reads data from a specified source database and extracts a desired subset of data. Next, the transform function works with the acquired data—using rules or lookup tables, or creating combinations with other data—to convert it to the desired state. Finally, the load function is used to write the resulting data (either all of the subset or just the changes) to a target database, which may or may not previously exist.

The Data-Mining module uses the classic extract-transform-load (ETL) operation to convert the data in the log files to the Star Schema. A star schema is a collection of dimensional tables and a fact table. Dimensions are tables containing textual description. The fields in the dimension table are called attributes. Primary dimensionality of the fact table is called a grain. Facts are additive information.

Figure 35:
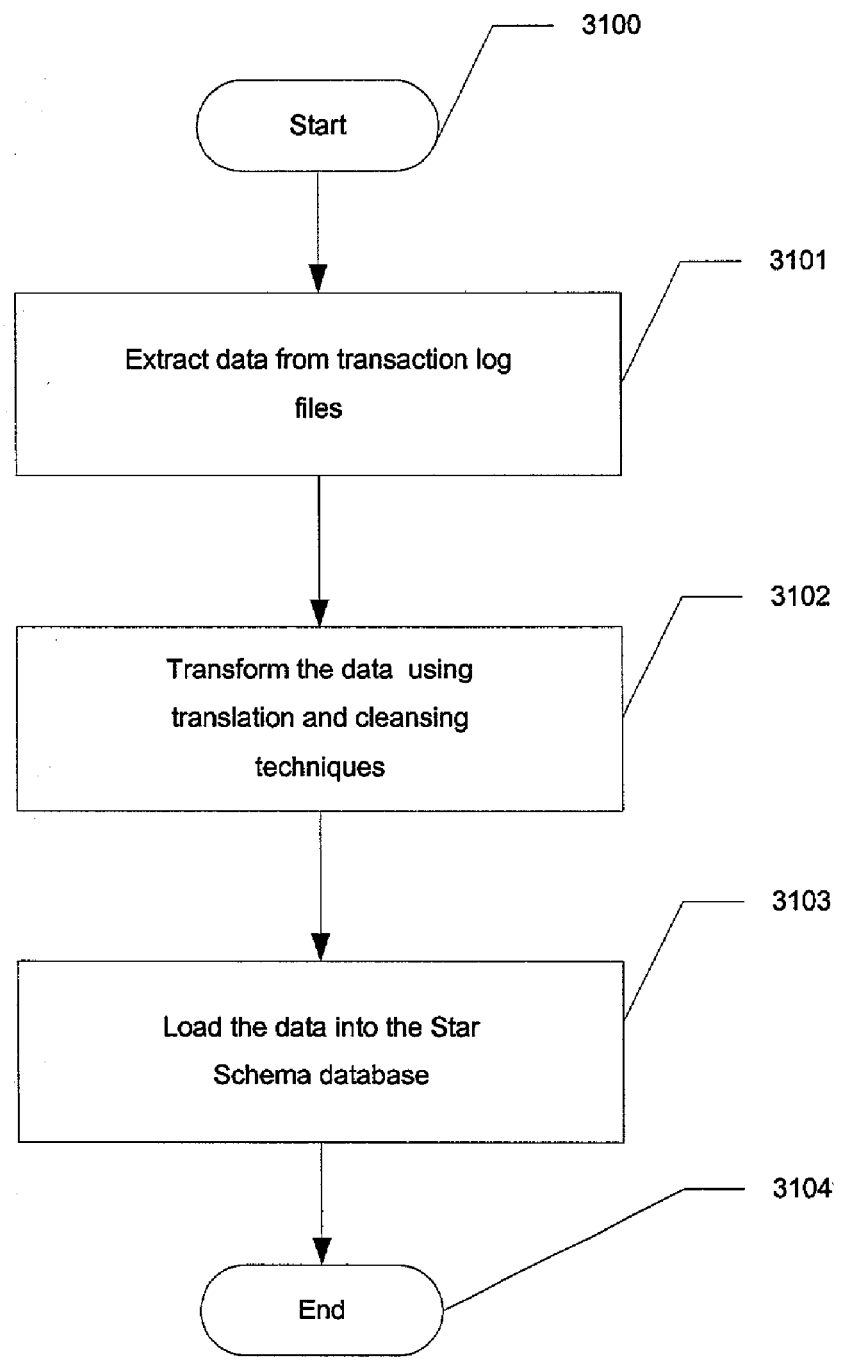
FIG. 35 is a flow diagram for extract, transform and load operation for multi-channel transaction log files.

With reference now to FIG. 35, there is shown a flow diagram of the ETL operation. Step 3101 is the extraction process during which the log files created by the run-time system are read and made available for the transformation process.

The transformations process in step 3102 uses the standard techniques of value translation and cleansing and the data is prepared for loading. Specifically the date information, which is in milliseconds format is translated to database specific date-time format. The user-agent information is parsed and, the device and browser information are extracted. The carrier information is determined from the subscriber identifier using a mapping table containing the relationship between the carrier and the subscriber. The cleansing technique removes inaccurate data containing invalid subscriber identifier, invalid user-agent and hits from monitoring scripts.

The data loading process, step 3103, takes the transformed data from step 3102, determines the dimensions for the target star schema, and populates the database. If a dimension value is already present then the foreign key identifier is used to write the record to the fact table. If the dimension value is absent then a new record is created in the dimension table and the corresponding identifier is used to write the record to the fact table.

Figure 36:
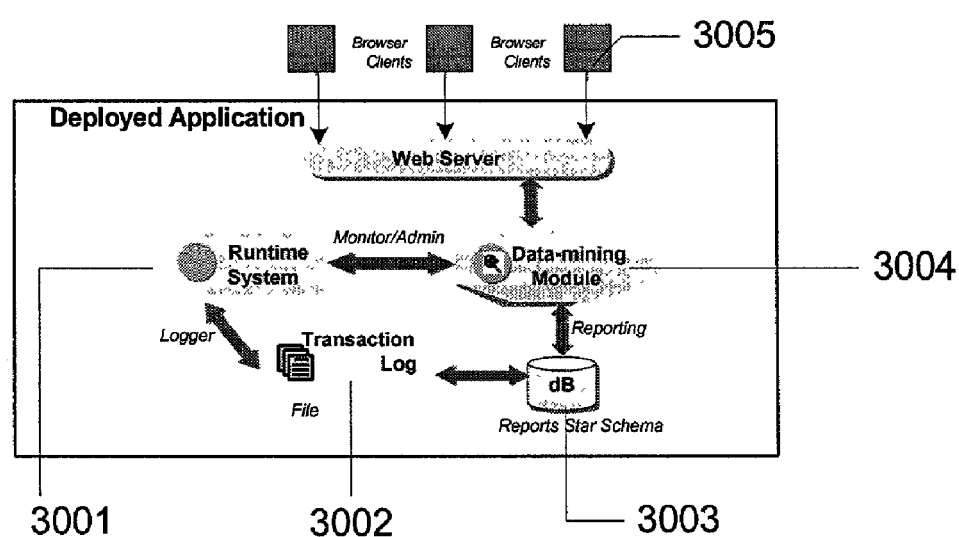
FIG. 36 is a figure that shows the interaction between the Data mining module and run-time system.
Figure 37:
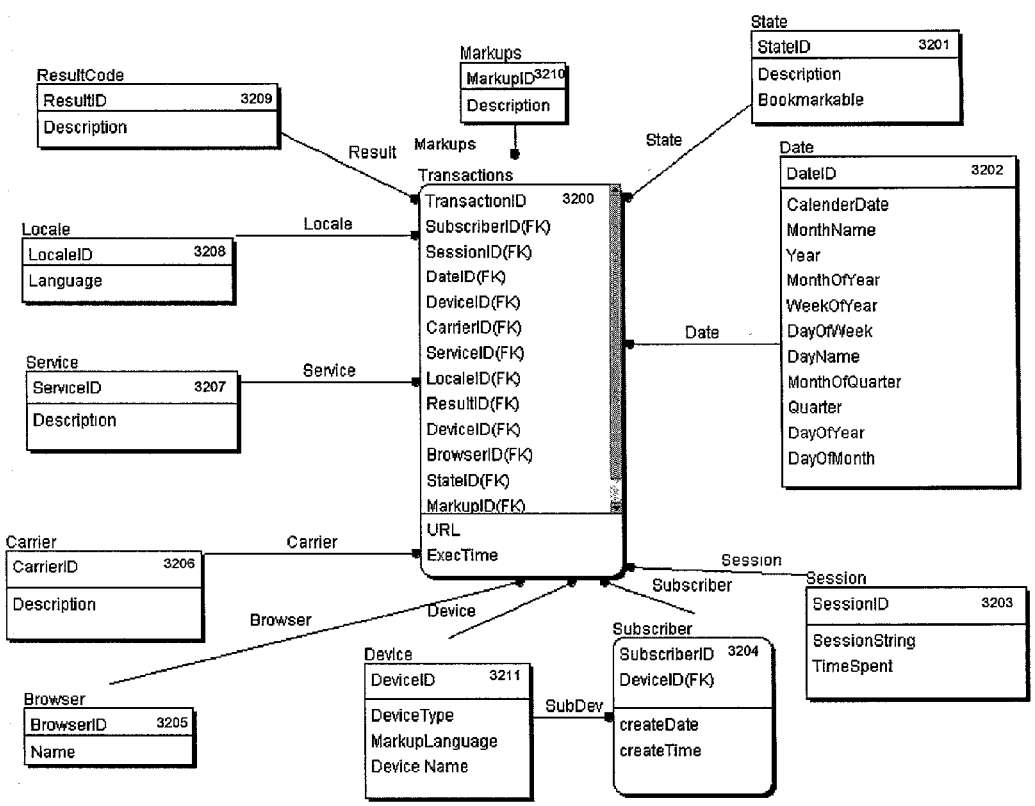
FIG. 37 is figure that shows a transaction star schema for multi-channel, multi-modal applications.

FIG. 36 illustrates the interaction between the data-mining module and the run-time system. Every time a client, 3005, connects to the run-time system, 3001, the request is processed by the run-time system, 3001, and it generates application log files, 3002, in a specific format. The data-mining module 3004 monitors the run-time system for transaction log files 3002. When the data-mining module 3004 finds the transaction log files 3002, it picks them up and populates the star schema database 3003.

An embodiment of a star schema specific to analyzing user transactions over multiple channels is presented in FIG.

37. The different dimensions in the multi-channel, multi-modal star schema are subscribers, sessions, dates, browsers, carriers, services, locales, result codes, states, markups and devices.

The different dimensions are described as follows:

Subscribers—Contains the unique subscriber identifier. The date of creation of the subscriber is the only attribute for this dimension.

Sessions—Stores the unique session identifier. The attributes for this dimension are date of creation, last access date, and session string.

Browsers—Stores the different micro-browser provider identifiers. The browser name is the only attribute for this dimension.

Carriers—Stores the different WAP carrier names through which the application was accessed. The carrier description is the only attribute for this dimension.

Services—Stores the different services, (for e.g. SMS, Location), accessed by the application. The service description is the only attribute for this dimension.

Locales—Stores the different locales from where the application was accessed. The language associated with this locale is the only attribute for this dimension.

ResultCodes—Stores all errors that happened while accessing the application. The description of the error is the only attribute for this dimension.

States—Stores all the states that were to be traversed while accessing the application. The attributes associated with this dimension are the state description and the type of state.

Date—Stores the dates and times of all the sessions.

Devices—Stores all the different device identifiers that were used to access the application.

Markups—Stores all the different markup languages in which the output to the device was rendered.

The transaction table serves as a fact table and stores all the transactions with foreign key references to the Dimension tables. In addition the transaction table includes the execution time and access date attributes.

Figure 38:
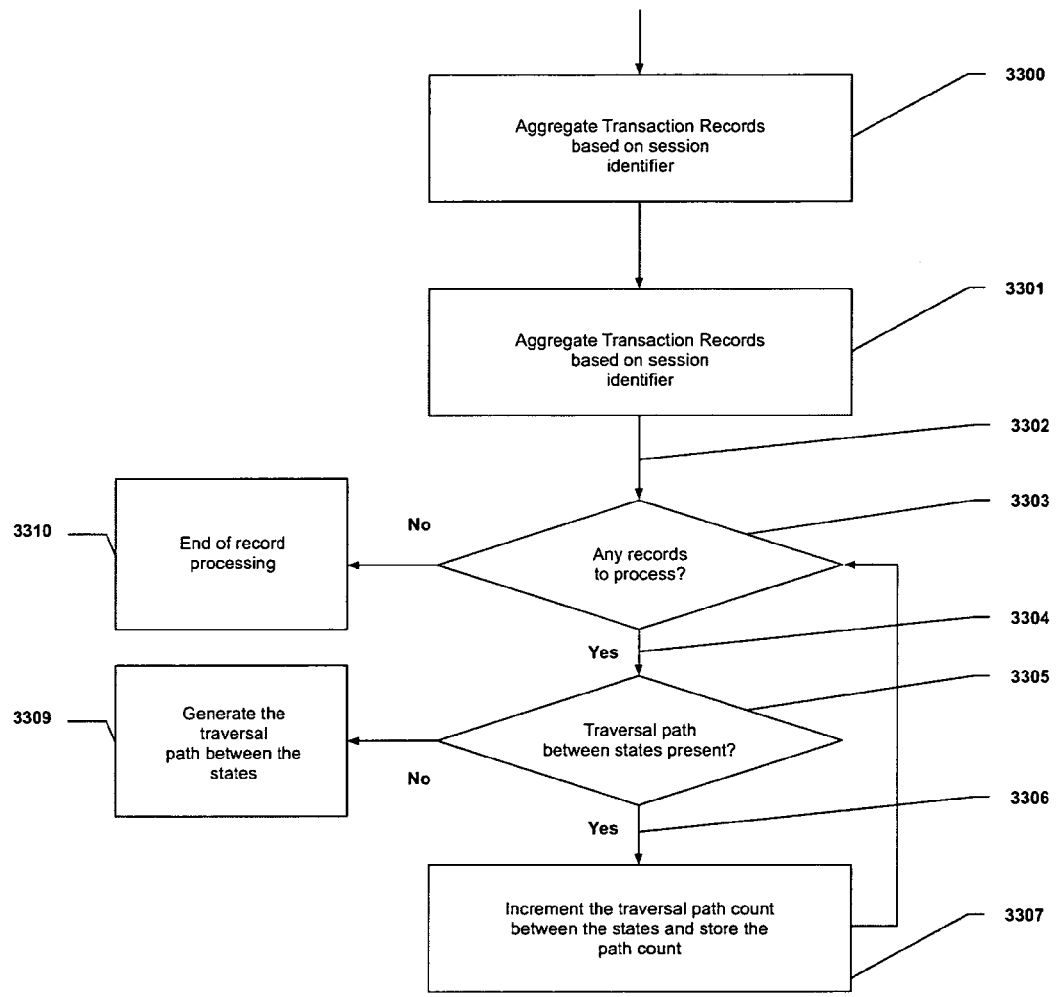
FIG. 38 is a flowchart that shows the algorithm to analyze the path traversals count.

An embodiment of an algorithm to analyze star schema and determine all the paths traversed by all user sessions is presented here. This algorithm helps in generating a unique report showing the user traversal patterns. The Data-mining module uses the algorithm and generates the report. FIG. 38 shows a flow diagram for the algorithm.

The records in the transaction table are aggregated in step 3300 using a unique session identifier to represent the unique user sessions.

In step 3301 the records are then sorted in an ascending order based on the date and time at which the transaction was recorded. In step 3302, a check is made for determining the number of records. This leads to a decision 3303.

The no-branch of 3303 leads to 3310 where it is determined that the processing has been completed. In the yes-branch of 3303 it is checked whether there is a path present between states corresponding to consecutive transactions referred by the two records. This leads to a decision 3305.

The yes-branch of 3305 leads to 3307 where the traversal counter for the path between the states is incremented and is stored in a path count. The no-branch of 3305 leads to step 3309 where a new traversal path between the states is generated.

The step 3309 in turn leads to step 3307. After the step 3307, the step 3314 leads back to processing records. The processing is continued till all the records are exhausted.

For example, consider the airline reservation application. The purpose of the application is to allow users to book a ticket using multiple channels. The application allows both voice and WAP access. A user accesses the ticketing application through a web-enabled cellular phone using a URL. If the user wants voice access he will call the number where the voice application is running.

Figure 39:
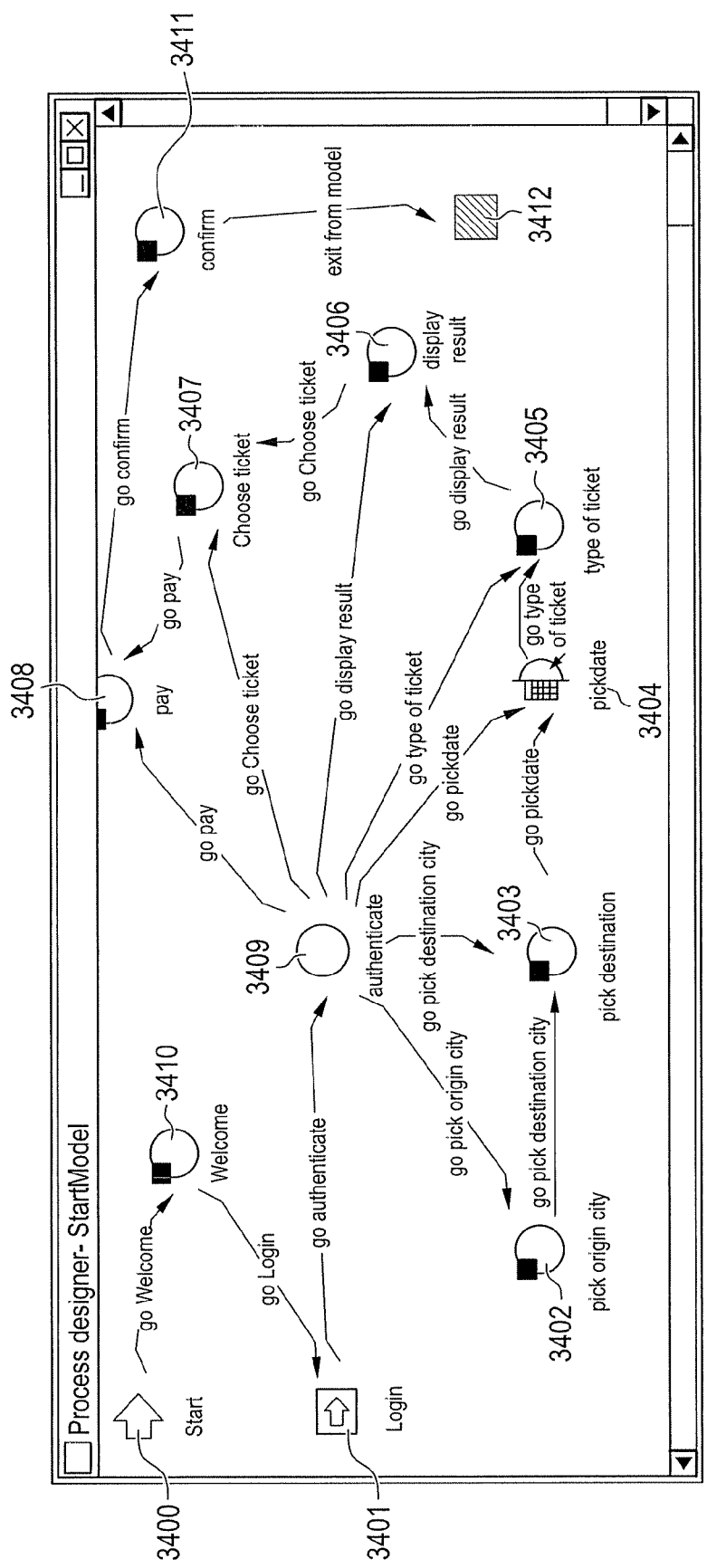
FIG. 39 is an exemplary airline application used to illustrate path analysis of state based applications.

Refer to FIG. 39 for the entire flow of an exemplary airline application. The airline application flow shows that there are number of states (States 3400–3412). There is one start state, 3400 and one end state, 3412. The users of the application can login, 3401, and are authenticated, in step 3409. Once authentication is successful they can choose any of the paths shown in the application flow. A transaction is complete if the user enters through the start-state and leaves through the exit state. A transaction is incomplete if the above principle is violated.

Users would typically access the application using a WAP enabled mobile phone. For example let us consider a sample user xyz traveling in a train and trying to book a ticket. The user xyz is using a mobile handset to buy an airline ticket from London to San Francisco. The user would use the step illustrated in FIG. 40 to buy the ticket.

Figure 40:
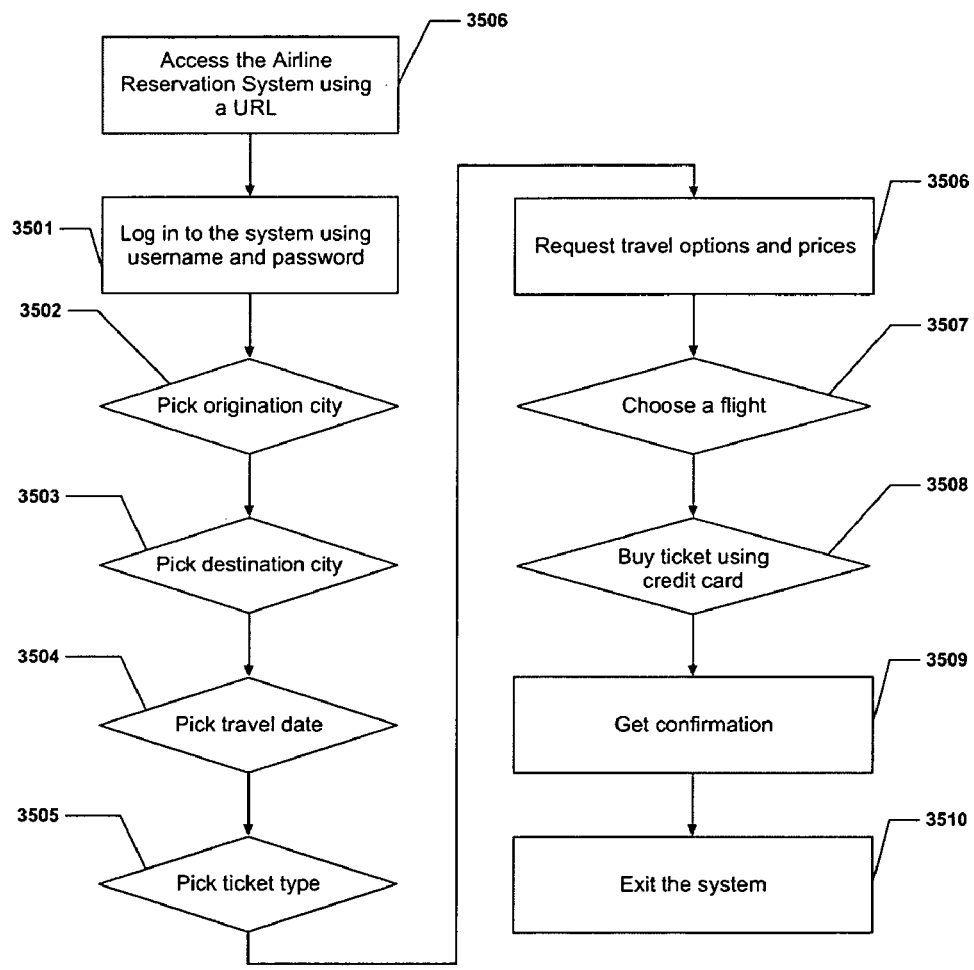
FIG. 40 is a flowchart of an exemplary airline application scenario that shows steps taken by a user to buy a ticket using mobile handset.

With reference to FIG. 40, the user xyz accesses the Airline Reservation System using the mobile handset in step 3500.

In step 3501 the user xyz logs into the system using this username and password. The system authenticates the user and allows him to proceed further on positive authentication.

The user picks up the origination city (London, Heathrow) in step 3502. In step 3503, the user selects the destination city (San Francisco, Calif.). The date of travel (2 Mar. 2002) is picked in the step 3504. In step 3505, the user chooses the ticket type (Economy/First-Class).

The travel options and prices for different flights are viewed in step 3506, and in step 3507, the user chooses a flight. The user buys the ticket for his travel using his credit card in step 3508. In step 3509, the user confirms the purchase of the ticket and then exits the system in step 3510.

For user xyz there would be a session associated with his usage of application of buying a ticket and tracked by the session identifier. The entire user xyz interaction with the application is stored in the Star Schema database. The steps taken by user xyz would be most common path taken by all users to buy a ticket.

Different users may want to use the airline application for different things. Some users may use the system to buy a ticket while some others may choose to check for flight details. Some users may choose not to buy a ticket because of the price while some others may not buy because of ticket non-availability. All the interactions of all users would be captured similar to user xyz in the Star Schema database.

Figure 41:
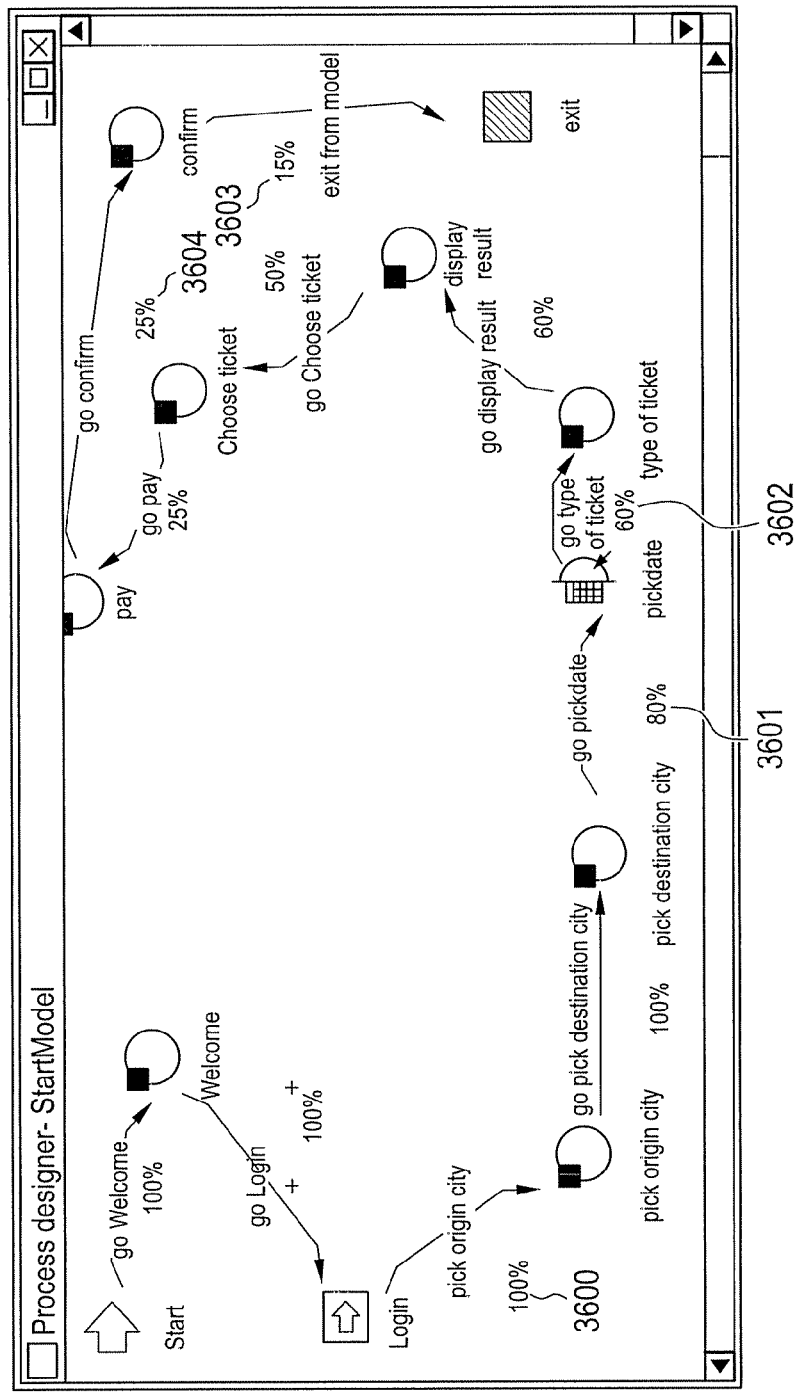
FIG. 41 uses the exemplary airline application and further illustrates the path traversal analysis of the "Booking a Ticket" business process as percentage of the total number of user accesses.

Over a period of time, a lot of requests would have been performed by users using the airline application. The algorithm shown in FIG. 38 and described before is used to compute the traversal counts for all the paths and for all sessions. Using the total hits to the application and the traversal counts for all the paths, a graph can be drawn showing the percentage of user sessions frequenting the different paths. FIG. 41 illustrates a graph obtained by computing the traversal counts for the airline application for a set of users. With reference to the figure it can be determined that 100% of the users, 3600, who logged into the system were authenticated successfully. Of the 80% of the users, 3601, which picked a date for travel only 60% of them, 3602, chose a type of ticket. Only 25% of the users,

3604, chose to pay for the ticket using some method like credit card and only 15%, 3603, of all users who logged in purchased the tickets.

This technique of analyzing is powerful and extremely useful because it helps in finding out the most frequented paths of the application, thereby exposing the most used states in an application. This analysis serves as a tool to determine the critical paths so that the performance and user experience can be improved. Consider the following examples: 1) If all transactions engaged through a voice terminal never succeeded beyond 'pick a origin city' step then a business analyst would determine that there is a usability problem in that step. Appropriate measures would be taken to rectify the step. 2) If it is determined that majority of WAP users of the airline application spend their time checking the flight arrival then a determination would be made to customize those paths to improve the user experience. 3) If it is noticed that majority of WAP users of the airline application use mobile devices which support color and graphics then a business analyst would determine a need for enhanced graphical capabilities for the application. 4) If it is noticed that majority of users of the application use a specific credit card company for paying their ticket cost then a business analyst would determine a need for partnering with the specific credit card company or providing a mobile service offered by that company to provide a better user experience to the users.

Using known database techniques of query based retrieval, several other useful reports are provided in the preferred embodiment of the Data-mining module besides the path traversal report. Some of them include the unique-user report, unique-carrier report, concurrent user report, unique-devices report, response-time report, and session-duration report. One that is skilled in the art of analysis can easily extend the reports available in the preferred embodiment using the same data for specific purposes.

For example, the session-duration report is useful because it tells the states where the users spent most of their time. Referring to FIG. 39, for example in the airline application, by knowing that most voice users spent 50 seconds in Login state 3401, the user experience at this state can be improved and latency reduced.

For example, the response-time report is the time taken by the application at each state to get back to the user. Referring to FIG. 39, for example in the airline application, by knowing that the 'display result' state 3406 took an average execution time of two minutes gives an idea of the run-time system bottlenecks. The application developer can use the bottlenecks determined by the execution times and improve the performance of the code pertaining to that state.

In an embodiment, the Data-mining module provides an extensible system for the analysis of Multi-Channel Multi-Modal applications.

SUMMARY

In summary the run-time system and the Data-mining module of the invention execute and analyze a complete multi-channel multi-modal solution that enables access to a heterogeneous set of applications from virtually any wireless and wire-line device.

The run-time system 92 enables delivery of such applications in a channel neutral manner through network, protocol and device independence. It simplifies the complexities of mobile applications by creating a single environment for running and monitoring voice and data applications, and leveraging information technology investing by providing data integration with existing data sources. The run-time system optimizes the user experience by presenting content in a format that is most suitable for the requesting device. User experience is further enhanced with multi-modal capabilities and personalization. One of ordinary skill in the art will appreciate that traditional methods of maintaining different presentation templates for each device type to solve this problem are not just difficult but virtually impossible, with the constant inception of new devices in the market.

The Data-mining module 93 enables state based analysis of multi-modal multi-channel applications. With a star schema designed specifically to analyze multi-channel applications, and a standard query language interface to generate reports, it provides a highly extensible system for generating reports. Further, the specific technique of path analysis in state-based applications is an extremely useful technique that helps understand user behavior and enhance user experience.

We claim:

1. A method for handling an interrupted transaction during operation of a multi-channel application comprising a number of workflow dimensions and being capable of operating over a plurality of channels in a multi-channel system, comprising:

transmitting a first request from a first-type of device for a first session with the multi-channel application over a first channel, wherein the first request comprises a unique identifier associated with a user of the first-type of device;

associating the first-type of device with the unique identifier such that the first-type of device is designated a first-type of registered device;

instantiating the multi-channel application for operation with the first-type of registered device over the first channel by enabling selected ones of the workflow dimensions used by the application when operating with the first-type of registered device over the first channel;

storing session data while the first-type of registered device communicates with the multi-channel application over the first channel, and associating the session data with the unique identifier;

transmitting, if the first session is interrupted before completion of the transaction, a second request to continue the transaction via a second-type of registered device over a second channel, wherein the second request includes the unique identifier;

presenting the user with an option to continue the transaction from a previous point of execution of the multi-channel application; and reconstructing the transaction up to the previous point of execution of the multi-channel application based on the stored session data; and continuing the transaction with the multi-channel application over a second channel by instantiating the multi-channel application for operation with the second-type of registered device over the second channel by enabling other selected workflow dimensions used by the application when operating with the second-type of registered device over the second channel.

2. A method according to claim 1, wherein the second-type of registered device is different than the first-type of registered device.

3. A method according to claim 1, further comprising:

displaying a first personalized interface on the first-type of registered device during the first session with the multi-channel application over the first channel; and displaying a second personalized interface on the second-type of registered device.

4. A method according to claim 1, wherein the second channel comprises a different medium than the first channel.

5. A method according to claim 1, wherein the session data comprises transaction specific information regarding the transaction.

6. A method according to claim 1, wherein the transaction specific information comprises at least one of current state information associated with a workflow path of the transaction and memory objects associated with the transaction.

7. A system for handling an interrupted transaction during operation of a multi-channel application capable of operating over a plurality of channels in the system, the system comprising:
  a first-type of device configured to transmit a first request for a first session with the multi-channel application over a first channel, wherein the first request comprises a unique identifier associated with a user of the first-type of device;
  a server configured to serve different instantiations of the multi-channel application, wherein the multi-channel application comprises a number of workflow dimensions; wherein the server is further configured to:
    receive the first request,
    associate the first-type of device with the unique identifier such that the first-type of device is designated a first-type of registered device,
    instantiate the multi-channel application for operation with the first-type of registered device over the first channel by enabling selected ones of the workflow dimensions used by the application when operating with the first-type of registered device over the first channel, and
    store session data during the first session while the first-type of registered device communicates with the multi-channel application over the first channel, and associating the session data with the unique identifier; and
  a second-type of registered device configured to transmit a second request to the server to continue the transaction via a second-type of registered device over a second channel, if the first session is interrupted before completion of the transaction, wherein the second request includes the unique identifier, and
  wherein the server is further configured to:
    present the user with an option to continue the transaction from a previous point of execution of the multi-channel application,
    reconstruct the transaction up to the previous point of execution of the multi-channel application based on the stored session data, and
    continue the transaction with the multi-channel application over a second channel by instantiating the multi-channel application for operation with the second-type of registered device over the second channel by enabling other selected workflow dimensions used by the application when operating with the second-type of registered device over the second channel.

8. A system according to claim 7, wherein the second-type of registered device is different than the first-type of registered device.

9. A system according to claim 7, wherein the first-type of registered device is configured to display a first personalized interface during the first session with the multi-channel application over the first channel.

10. A system according to claim 7, wherein the second-type of registered device is configured to display a second personalized interface, and to store other session data while the second-type of registered device communicates with the multi-channel application over the second channel.

11. A system according to claim 7, wherein the second channel comprises a different medium than the first channel.

12. A system according to claim 7, wherein the session data comprises transaction specific information regarding the transaction.

13. A system according to claim 12, wherein the transaction specific information comprises at least one of current state information associated with a workflow path of the transaction and memory objects associated with the transaction.

* * * * *

UNITED STATES PATENT AND TRADEMARK OFFICE
CERTIFICATE OF CORRECTION

| | | |
|---|---|---|
| PATENT NO. | : 7,174,534 B2 | |
| APPLICATION NO. | : 10/053767 | |
| DATED | : February 6, 2007 | |
| INVENTOR(S) | : Kelvin Chong et al. | |

It is certified that error appears in the above-identified patent and that said Letters Patent is hereby corrected as shown below:

Claim 6, column 31, line 8, delete the words "claim 1" and insert the words --claim 5--.

Signed and Sealed this

Fifteenth Day of May, 2007

JON W. DUDAS
*Director of the United States Patent and Trademark Office*